(12) United States Patent
Kubota

(10) Patent No.: US 8,576,205 B2
(45) Date of Patent: Nov. 5, 2013

(54) COMMUNICATION BETWEEN IMAGE SUPPLY DEVICE AND IMAGE DISPLAY DEVICE

(75) Inventor: Shinji Kubota, Ina (JP)

(73) Assignee: Seiko Epson Corporation, Tokyo (JP)

( * ) Notice: Subject to any disclaimer, the term of this patent is extended or adjusted under 35 U.S.C. 154(b) by 1200 days.

(21) Appl. No.: 11/681,585

(22) Filed: Mar. 2, 2007

(65) Prior Publication Data
US 2007/0222955 A1 Sep. 27, 2007

(30) Foreign Application Priority Data
Mar. 27, 2006 (JP) .................................. 2006-085913

(51) Int. Cl.
*G03B 27/00* (2006.01)
(52) U.S. Cl.
USPC .......................................................... 345/204
(58) Field of Classification Search
USPC ..................... 345/1.1–1.2, 3.1, 531, 204, 418
See application file for complete search history.

(56) References Cited

U.S. PATENT DOCUMENTS

| | | | |
|---|---|---|---|
| 7,061,477 B1 | 6/2006 | Noguchi | |
| 2001/0050679 A1* | 12/2001 | Shigeta | 345/204 |
| 2002/0135584 A1* | 9/2002 | Lee | 345/531 |
| 2003/0063196 A1* | 4/2003 | Palatov et al. | 348/211.2 |
| 2003/0179155 A1* | 9/2003 | Someya | 345/1.1 |
| 2003/0231167 A1* | 12/2003 | Leung | 345/173 |
| 2004/0075815 A1* | 4/2004 | Huang | 353/30 |
| 2004/0150650 A1* | 8/2004 | Mendelson et al. | 345/589 |
| 2004/0164925 A1* | 8/2004 | Boger | 345/3.1 |
| 2004/0189706 A1* | 9/2004 | Ieperen | 345/773 |
| 2005/0278455 A1 | 12/2005 | Ichieda | |
| 2006/0001595 A1* | 1/2006 | Aoki | 345/1.2 |
| 2006/0109349 A1 | 5/2006 | Takashima | |
| 2006/0145941 A1* | 7/2006 | Park et al. | 345/1.1 |
| 2006/0165132 A1* | 7/2006 | Chang | 370/535 |
| 2007/0070308 A1* | 3/2007 | Chen | 353/119 |
| 2007/0206001 A1* | 9/2007 | McKay | 345/418 |
| 2007/0233294 A1* | 10/2007 | Holden et al. | 700/94 |

FOREIGN PATENT DOCUMENTS

| | | |
|---|---|---|
| JP | A-2001-125551 | 5/2001 |
| JP | A 2002-369051 | 12/2002 |
| JP | A-2003-50694 | 2/2003 |
| JP | A 2004-69996 | 3/2004 |
| JP | A 2004-86277 | 3/2004 |
| JP | A-2004-147014 | 5/2004 |
| JP | A-2004-177784 | 6/2004 |
| JP | A 2004-310672 | 11/2004 |

(Continued)

*Primary Examiner* — Quan-Zhen Wang
*Assistant Examiner* — Tony Davis
(74) *Attorney, Agent, or Firm* — Oliff & Berridge, PLC

(57) ABSTRACT

There is provided an image display device which is connected to a general-purpose interface connectable to a plurality of types of general-purpose devices as an interface for an image supply device and displays images sequentially based on a plurality of image data sequentially supplied from the image supply device, the image display device including a communication controller that controls data communication through the interface and an image display unit that displays an image based on the image data, wherein the communication controller transmits identification information representing a predetermined general-purpose device other than the image display device as identification information representing the type of the image display device to the image supply device for starting the data communication, and wherein the communication controller receives the image data from the image supply device as the general-purpose device and supplies the received image data to the image display unit for display.

18 Claims, 20 Drawing Sheets

(56) References Cited

FOREIGN PATENT DOCUMENTS

| JP | A-2005-340918 | 12/2005 |
| JP | A 2006-285070 | 10/2006 |
| WO | WO 2005/001701 A1 | 1/2005 |

* cited by examiner

D9 COMMAND CDB

| BYTE \ BIT | 7 | 6 | 5 | 4 | 3 | 2 | 1 | 0 |
|---|---|---|---|---|---|---|---|---|
| 0 | OPERATION CODE(D9h) | | | | | | | |
| 1 | LUN(0h) | | | Reserved(0h) | | | | |
| 2 | UD COMMAND CODE | | | | | | | |
| 3 | MSB | | | | | | | |
| 4 | DATA TRANSMISSION LENGTH, BINARY NOTATION (UNIT IS BYTE), | | | | | | | |
| 5 | | | | | | | | |
| 6 | | | | | | | | LSB |
| 7 | CE FLAG (C: DATA CONTINUATION, E: END) | | | | | | | |
| 8 | N/A(0h) | | | | | | | |
| 9 | N/A(0h) | | | | | | | |
| 10 | N/A(0h) | | | | | | | |
| 11 | LINK FLAG (0h) | | | | | | | |

FIG. 6

CHANGED REGION INFORMATION 106a:
- x COORDINATE OF CHANGED REGION: Xa
- y COORDINATE OF CHANGED REGION: Ya
- WIDTH OF CHANGED REGION: Wa
- HEIGHT OF CHANGED REGION: Ha

CHANGED REGIONS RA1 AND RA2

CHANGED REGION INFORMATION A1

CHANGED REGION INFORMATION A2

TRANSMISSION REGION TG1 OF WHICH IMAGE IS ACQUIRED FROM RAM 106

TRANSMISSION REGION TG2 OF WHICH IMAGE IS ACQUIRED FROM VRAM 114

SCREEN UPDATE REGION TTG

SCREEN UPDATE REGION TTG

SCREEN UPDATE REGIONS AFTER DIVISION R11~R13

CHANGED REGIONS RA1 AND RA2

CHANGED REGION INFORMATION A1
CHANGED REGION INFORMATION A2

TRANSMISSION REGION TG1 OF WHICH IMAGE IS ACQUIRED FROM RAM 106

TRANSMISSION REGION TG2 OF WHICH IMAGE IS ACQUIRED FROM VRAM 114

SCREEN UPDATE REGION TTG

COMMUNICATION BETWEEN IMAGE SUPPLY DEVICE AND IMAGE DISPLAY DEVICE

BACKGROUND

1. Technical Field

The present invention relates to communication between an image supply device and an image display device.

2. Related Art

Various peripheral devices such as data memory devices, input devices, and image display devices have been connected to computers and used. As general-purpose interfaces for the simple connection of the various peripheral devices, USB (universal serial bus) interfaces have been frequently used (see the patent document JP-A-2004-69996).

In order to support data communication between a computer and a peripheral device that is connected to the computer through an interface, a communication protocol appropriate for the type of the peripheral device is used. For example, when an image display device such as a projector is connected to a general-purpose interface other than a dedicated interface for image signals, a dedicated communication protocol that is different based on the type of the image display device is used.

However, in order to use an interface control program (also called a device driver) for the dedicated communication protocol, various operations are required. For example, a user himself should install the dedicated device driver on the computer. In addition, a manufacturer of the image display device should develop a new dedicated device driver for the image display device. As described above, enormous efforts have been required to use the image display device.

In addition, this problem is common to general-purpose interfaces that can be arbitrary connected to a plurality of types of general-purpose devices, rather than limited to the USB interfaces. Moreover, generally, the problem is common to systems which provide images from an image supply device to an image display device through the interface for displaying the images, rather than limited to a case where an image display device is connected to a computer.

SUMMARY

An advantage of some aspects of the invention is to provide a technology capable of reducing efforts to use an image display device.

According to a first aspect of the invention, there is provided an image display device which is connected to a general-purpose interface connectable to a plurality of types of general-purpose devices as an interface for an image supply device and displays images sequentially based on a plurality of image data sequentially supplied from the image supply device. The image display device includes a communication controller that controls data communication through the interface, and an image display unit that displays an image based on the image data. The communication controller transmits identification information representing a predetermined general purpose device other than the image display device as identification information representing the type of the image display device to the image supply device for starting the data communication. In addition, the communication controller receives the image data from the image supply device as the general-purpose device and supplies the received image data to the image display unit for display.

In this image display device, the image display device is identified as a general-purpose device, and accordingly it is possible to easily perform data communication between the image supply device and the image display device. As a result, the efforts to use the image display device can be reduced.

In this image display device, preferably the interface may be a USB interface, and the identification information may be configured to a mass storage class.

The USB interface can be easily connected between devices and accordingly, can be used simply. The mass storage class is designed not to excessively decrease the speed of data transmission to the data memory device for fast writing data into the data memory device. Accordingly, it becomes possible to perform the transmission of the image data quickly.

Preferably, the image display device may further include a data memory unit that can be accessed by the image supply device. It is preferable that the communication controller may (i) supply received data to the data memory unit when receiving a communication command for reading data as a communication command used in communication based on the mass storage class and (ii) supply received data to the image display unit as image data when receiving a predetermined communication command other than a communication command for reading data.

Under this configuration, the image display device can receive the image data and supply various data stored in the data memory unit to the image supply device.

In addition, preferably, the data memory unit may store an image transmission program for implementing a function of transmitting the image data to the image display device using communication based on the mass storage class into a computer.

Under this configuration, since a program for transmitting the image data to the image display device can be provided to the image supply device, the efforts to use the image display device can be reduced.

In the image display device, preferably, the mage transmission program may implement a function of transmitting update image data which represents a partial region of a current image including a changed region into the computer for displaying an image in which only a partial region is changed from a current image to be displayed by image data which has been transmitted on the image display device.

Under this configuration, when an image of which only a partial region is changed is to be displayed on the image display device, a part of the region including the changed region is transmitted, and accordingly, the data amount transmitted between the image supply device and the image display device can be reduced. As a result, it becomes possible to increase an update frequency for the image that is displayed by the image display device.

In each image display device described above, preferably, the image display unit may update a partial region when receiving update image data that represents only the partial region of a current image to be displayed based on image data that has been received.

Under this configuration, when an image of which only a partial region is changed is to be displayed on the image display device, data for only a partial region including the changed region can be transmitted, and accordingly, the data amount transmitted between the image supply device and the image display device can be reduced. As a result, it becomes possible to increase an update frequency for the image that is displayed by the image display device.

According to a second aspect of the invention, there is provided an image supply device that sequentially supplies a plurality of image data to an image display device receiving the image data as a predetermined general-purpose device other than an image display device for sequentially displaying images. The image supply device includes a general-purpose interface which can be connected to a plurality of types of general-purpose devices as an interface to which the image display device is connected, a communication controller that controls data communication through the interface by identifying the type of the image display device as the general-purpose device, and an image transmission processing module that transmits the image data for display to the image display device identified as the general-purpose device other than the image display device by controlling the communication controller.

According to this image supply device, since the image display device is identified as the general-purpose device, it is possible to easily perform data communication between the image supply device and the image display device. As a result, the efforts to use the image display device can be reduced.

Preferably, in the image supply device, the interface may be a USB interface, and the communication controller may identify the type of the image display device as a mass storage class.

The USB interface can be easily connected between devices and accordingly, can be used simply. The mass storage class is designed not to excessively decrease the speed of data transmission to the data memory device for fast writing data into the data memory device. Accordingly, it becomes possible to perform the transmission of the image data quickly.

Preferably, in the image supply device, the image display device may further include a data memory unit which can be accessed by the image supply device, the image supply device may further include a data read module that reads data stored in the data memory unit by using a communication command for reading data as a communication command which is used in communication based on the mass storage class, and the image transmission processing module may transmit the image data using a predetermined communication command other than the communication command for reading data.

Under this configuration, the image supply device can transmit the image data and use various data that is stored in the data memory unit.

Preferably, in each image supply device described above, the image transmission processing module may have a function of transmitting update image data which represents a partial region of a current image including a changed region for displaying an image in which only a partial region is changed from a current image to be displayed by image data which has been transmitted on the image display device.

Under this configuration, when an image of which only a partial region is changed is to be displayed on the image display device, data for only a partial region including the changed region can be transmitted, and accordingly, the data amount transmitted between the image supply device and the image display device can be reduced. As a result, it becomes possible to increase an update frequency for the image that is displayed by the image display device.

The image supply device may further comprise an application program that can issue a drawing command, a drawing module for processing the drawing command which is issued by the application program, and a hook processing module which hooks a predetermined drawing command issued by the application program for fetching the drawing command in advance and draws an image in a predetermined image storage region for transmission included in a general-purpose memory based on the acquired drawing command. The image transmission processing module may have a function of acquiring an image from the image storage region for transmission and transmitting the acquired image to the image display device through the interface, and the hook processing module may have functions of writing a first changed region information representing a first changed region which is a region in the image storage region for transmission in which an image is drawn based on the predetermined drawing command into the general-purpose memory and supplying the drawing command to the drawing module after processing the predetermined drawing command. The drawing module may have functions of drawing an image in the frame memory based on a drawing command received from the application program or the hook processing module and writing a second changed region information representing a second changed region in which an image is drawer in the frame memory based on the drawing command into the general-purpose memory. The image transmission processing module may (i) acquire from the frame memory a partial image corresponding to a region of the second changed region which is not included in the first changed region with reference to the first and second changed region information stored in the general-purpose memory, (ii) acquire a partial image corresponding to the first changed region not from the frame memory but from the image storage region for transmission, and (iii) transmit the acquired partial mage together with screen update region information representing a screen update region which is a sum of the first and second changed regions to the image display device through the interface.

Under this configuration, when a predetermined drawing command is issued, the hook processing module instead of the drawing module hooks and acquires the drawing command and draws the image in the general-purpose memory, and accordingly, a speed of the whole transmission process can be improved compared to a case where the whole image to be transmitted is transmitted from the VRAM to the RAM (general-purpose memory). Although a region of the second changed region that is not included in the first changed region is not drawn by the hook processing modules the image for the region is acquired from the frame memory, and accordingly, it is possible to transmit the image without any loss.

The image supply device may further include an application program that can issue a drawing commands a drawing module for processing the drawing command which is issued by the application program and a hook processing module which hooks a predetermined drawing command issued by the application program for fetching the drawing command in advance and draws an image in a predetermined image storage region for transmission included in a general-purpose memory based on the acquired drawing command. The image transmission processing module has a function of acquiring an image from the image storage region for transmission and transmitting the acquired image to the image display device through the interface, wherein the hook processing module has functions of writing a first changed region information representing a first changed region which is a region in the image storage region for transmission in which an image is drawn based on the predetermined drawing command into the general-purpose memory and supplying the drawing command to the drawing module after processing the predetermined drawing command. The drawing module has functions of drawing an image in the frame memory based on a drawing command received from the application program or the hook processing module and writing a second changed region information representing a second changed region in which an image is drawn in the frame memory based on the drawing command into the general-purpose memory. The image transmission processing module (i) acquires from the frame memory a partial image corresponding to a region of the second changed region which is not included in the first changed region with reference to the first and second changed region information stored in the general-purpose memory, (ii) acquires a partial image corresponding to a region of the second changed region which is included in the first changed region not from the frame memory but from the image storage region for transmission, and (iii) transmits the acquired partial image together with screen update region information representing a screen update region which is a same as the second changed region to the image display device through the interface.

Under this configuration, when a predetermined drawing command is issued, the hook processing module instead of the drawing module hooks and acquires the drawing command and draws the image in the general-purpose memory, and accordingly, a speed of the whole transmission process can be improved compared to a case where the whole image to be transmitted is transmitted from the VRAM to the RAM (general-purpose memory).

The present invention may be implemented in various forms such as an image display system, an image supply device and an image display device which construct the image display system, a hook processing module and an image transmission processing module which are used for the image supply device, a method of supplying an image and a method of displaying an image, a computer program for implementing the methods and devices, and a recording media storing the computer program.

BRIEF DESCRIPTION OF THE DRAWINGS

Hereinafter, the invention will be described with reference to the accompanying drawings, wherein like numbers reference like elements.

FIG. 6 is a diagram showing an example of a D9 command.

FIG. 20 is a flowchart showing a sequence of process for the request of the projector 200a.

DESCRIPTION OF EXEMPLARY EMBODIMENTS

Hereinafter, the implemented forms of the present invention will be described based on the embodiments in the following order.

Figure 1:
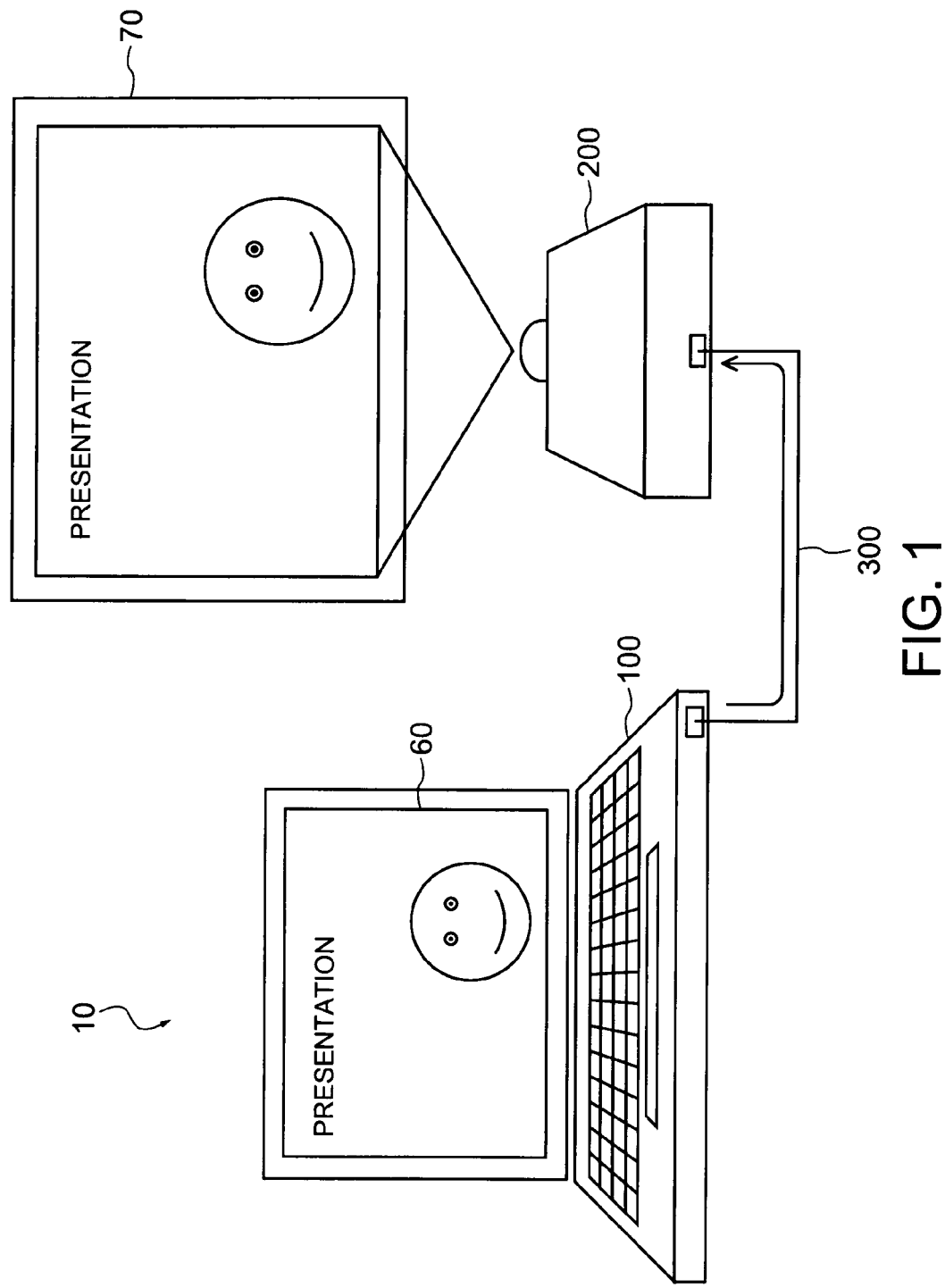
FIG. 1 is a diagram showing a configuration of an image display system according to an embodiment of the present invention.

A. First Embodiment
B. Second Embodiment
C. Third Embodiment
D. Fourth Embodiment
E. Fifth Embodiment
F. Modified Example A. First Embodiment FIG. 1 is a diagram showing a configuration of an image display system according to an embodiment of the present invention. The image display system 10 includes a personal computer 100 (hereinafter, also referred to as PC 100) as an image supply device, a projector 200 as an image display device, and a USB cable 300 connecting the computer 100 and the projector 200. The computer 100 provides an image to the projector 200 through the USB cable 300 and have the projector 200 project the image for displaying the image on a projection display screen 70.

Figure 2:
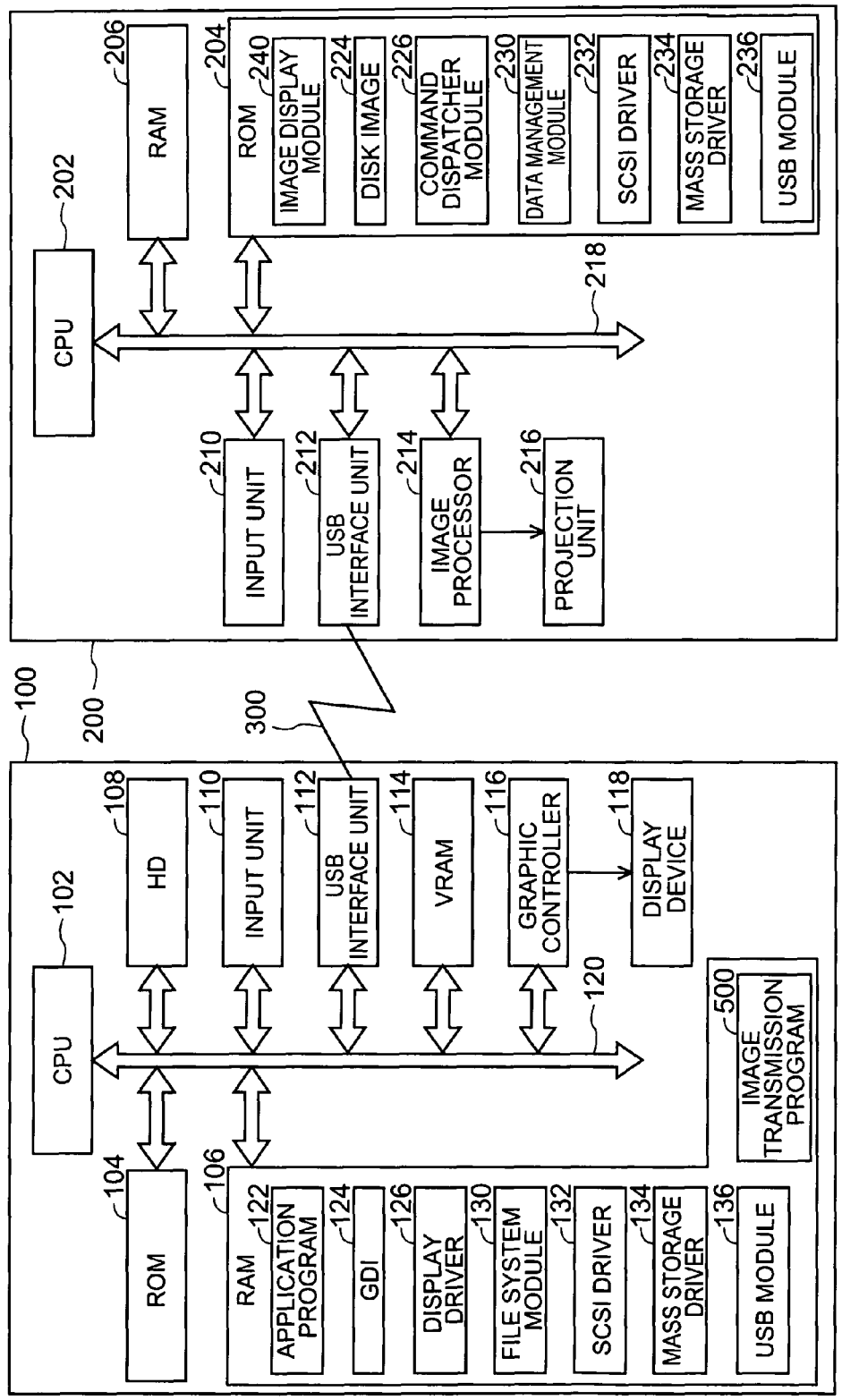
FIG. 2 is a block diagram showing internal configurations of the computer 100 and the projector 200.

FIG. 2 is a block diagram showing internal configurations of the computer 100 and the projector 200. The computer 100 includes a CPU 102, a ROM 104, and a RAM 106 as a general-purpose memory (also called a system memory), a hard disk drive 108, an input unit 110 including a keyboard and a pointing device, a USB interface unit 112, a VRAM 114 as a frame memory, a graphic controller 116, a display device 118 including a liquid crystal display, and a bus 120 connecting the described elements.

In the RAM 106, there are stored various computer programs including an application program 122, a graphics device interface (GDI) 124, a display driver 126, a file system module 130, an SCSI driver 132, a mass storage driver 134, a USB module 136, and an image transmission program 500. In addition, the GDI 124, the display driver 126, the file system module 130, the SCSI driver 132, the mass storage driver 134, and the USB module 136 serves as a part of an operating system (OS). In this embodiment, it is assumed that Windows (registered trademark) provided by Microsoft Corporation is used as an operating system. The various computer programs are stored in a computer readable recording medium such as a flexible disk or a CD-ROM and provided.

The GDI 124 is a computer program that uniformly manages drawing of a display device (for example, the display device 118 of the computer 100), a printing device (not shown), or the like. As is well known, the GDI 124 provides various application programs with application program interfaces (API) for drawing that are called GDI functions. Generally, an API is a set of procedures that are used by an application program to use various functions included in the operating system.

The application program 122 issues to the GDI 124 a drawing request, for example, for an image of a presentation sheet included in a presentation file. Generally, output information (that is, information for determining whether an image is output to a display device or a printing device, of an image is included in the drawing request. The GDI 124 receives the drawing request transferred from the application program 122, determines the output device of the image based on the drawing request, and, when the output device is the display device, transmits the drawing request to the display driver 126. The display driver 126 draws the image data in the VRAM 114 based on the received drawing request.

Other components of the computer 100 will be described later.

The projector 200 includes a CPU 202, a ROM 204, a RAM 206, an input unit 210 including various operation buttons, a USB interface unit 212, an image processor 214, a projection unit 216 including a light source lamp, a liquid crystal panel, and projection optical system, and a bus 218 connecting these elements. In the ROM 204, various computer programs including an image display module 240, a disk image 224, a command dispatcher module 226 (hereinafter, may be abbreviated as a dispatcher 226), a data management module 230, an SCSI driver 232, a mass storage driver 234, and a USB module 236 are stored.

Figure 3:
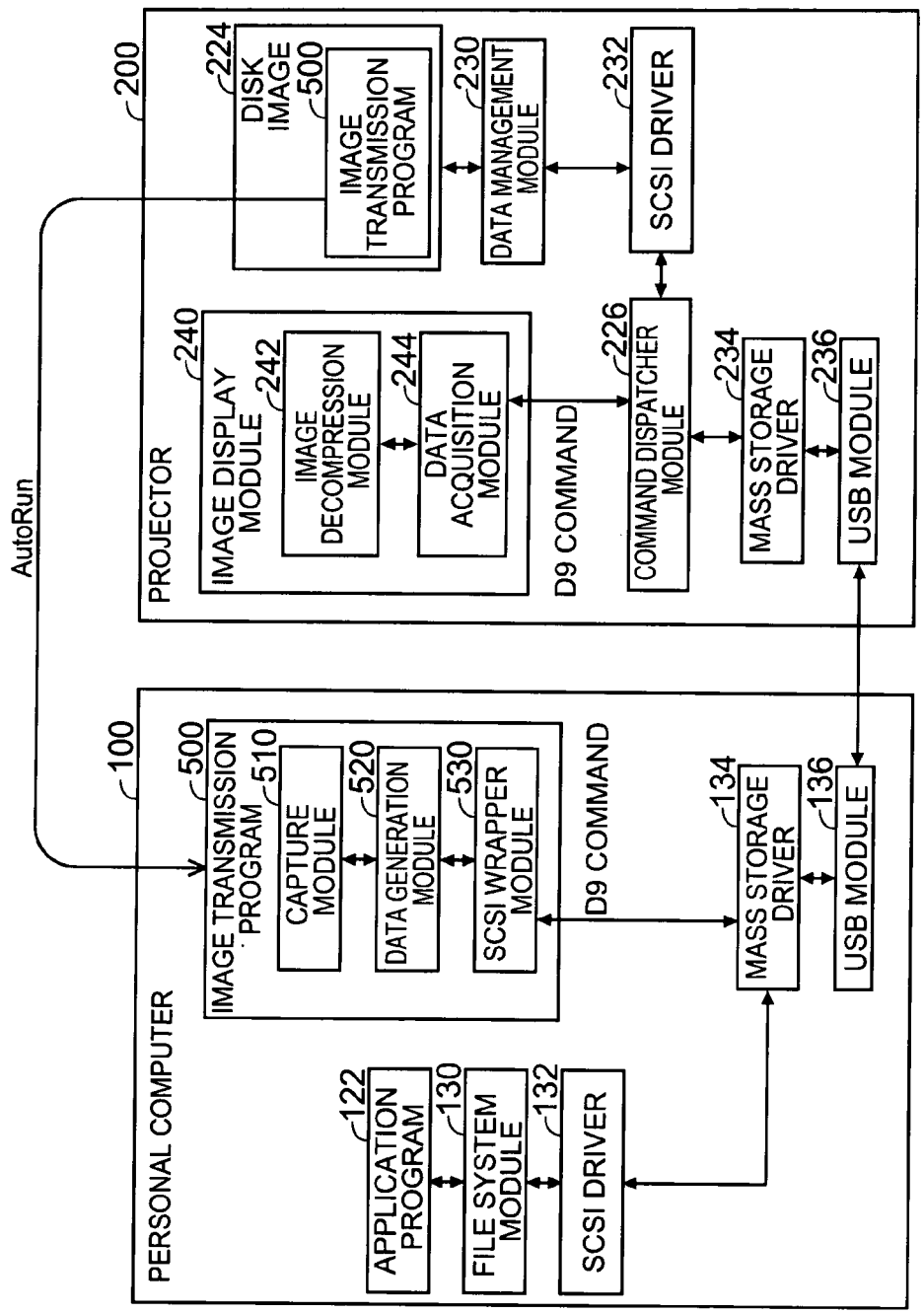
FIG. 3 is a block diagram showing the configuration of software according to a first embodiment of the invention in detail.

FIG. 3 is a block diagram showing the configuration of software in the first embodiment of the invention in detail in FIG. 3, each component is arranged in the same order as a level of the data communication. The USB modules 136 and 236 control the USB interface units 112 and 212 (in FIG. 2), respectively, and interpret the USB protocol and perform data communication. The mass storage drivers 134 and 234 arranged in a layer arranged upper than the layer of the USB modules 136 and 236 perform data communication according to a communication protocol of the mass storage class. The SCSI drivers 132 and 232 arranged in a layer upper than the layer of the mass storage drivers 134 and 234 perform data communication using an SCSI command set. The file system module 130 of the computer 100 manages the file system by issuing to the SCSI driver 132 a data access request. The data management module 230 of the projector 200 receives the access request from the computer 100 through the dispatcher 226 and the SCSI driver 232 and relays an access to a disk image 224 based on the access request.

In FIG. 3, detailed configurations of the image transmission program 500 and the image display module 240 are shown, too. The image transmission program 500 includes a capture module 510, a data generation module 520, and an SCSI wrapper module 530. The image display module 240 includes an image decompression module 242 and a data acquisition module 244. These modules will be described later in detail.

Figure 4:
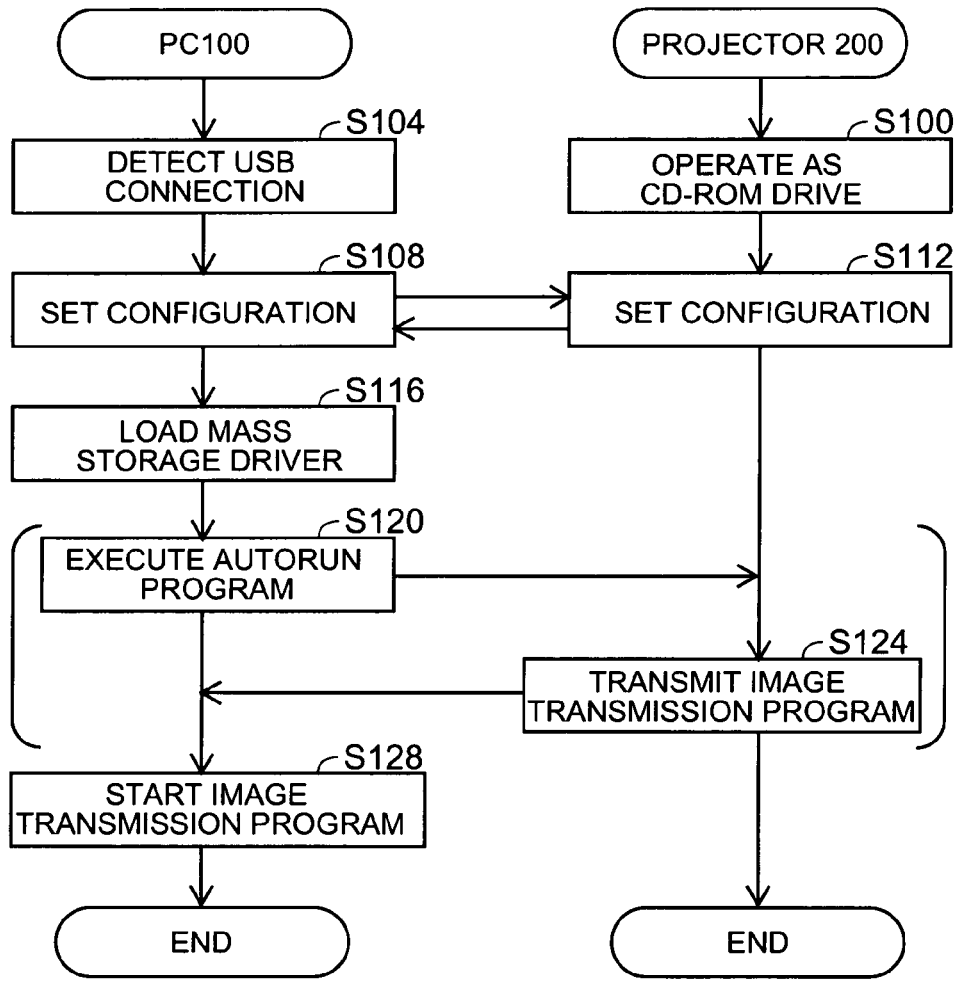
FIG. 4 is a flowchart showing a sequence of connection process, when the protector 200 is connected to the computer 100.

FIG. 4 is a flowchart showing a sequence of connection process, when the projector 200 is connected to the computer 100. At first, the projector 200 is operated as a CD-ROM drive by the SCSI driver 232 (in FIG. 3), the mass storage driver 234, and the USB module 236 (Step S100).

Next, the USB module 136 of the computer 100 detects through the USB cable 300 that the projector 200 is connected to the computer 100 (step S104) and requests configuration information of the device based on the detection to the projector 200 (step S108).

The USB module 236 of the projector 200 transmits the configuration information of the device to the computer 100 according to the request (step S112). In the configuration information of the device, information indicating that the projector 200 operates as a data memory device based on the USB standard is included. To be more specific, in the configuration information of the device, information indicating that the device class (interface class) of the USB device is the mass storage class is included. As is well known, a command set which can be used as the mass storage class is determined based on the interface subclass. The projector 200 in the first embodiment of the invention is assumed to correspond to the SCSI command set. Thus, in the configuration information of the device, information indicating that the subclass is the SCSI command set is included. Alternatively, one of various classes (for example, ATAPI) can be adopted as the subclass. In addition, in the configuration information of the device, other various USB descriptors are included.

The USB module 136 of the computer 100 (in FIG. 3) identifies the projector 200 as a device classified into a mass storage class upon receiving the configuration information of the device and loads a general-purpose mass storage driver 134 which is included in the OS as a standard (step S116). The mass storage driver 134 is loaded into an active OS process. Accordingly, by using the mass storage driver 134, the computer 100 can perform data communication with the projector 200.

The mass storage driver 134 corresponds to a class driver of the USB. The class driver is arranged on a layer on the driver (in the example of FIG. 3, the USB module 136) of the USB bus and is a communication control module that communicates with the USB device according to a communication protocol based on the type of the USB device. In the USB standards, the types of the USB devices are classified into a plurality of classes. For each class (that is, for each type of the devices), a different communication protocol is used. Here, it is possible to define a vendor specific class so as to use a USB device with various functions. In this case, a dedicated communication protocol (that is, a dedicated class driver) is used.

For several major classes, communication protocols are standardized for easily performing data communication between devices. The mass storage class is one of the major classes. The mass storage driver 134 performs data communication in accordance with a communication protocol for the mass storage class. The mass storage driver 134 is not limited to a data memory device of a specific manufacturer, and one of data memory devices (for example, a CD-ROM drive, a DVD-ROM drive, a hard disk drive, or a semiconductor memory) manufactured by various manufacturers can be used as the mass storage driver 134. Similarly, a common-purpose data memory device (for example, a CD-ROM drive) using a standard communication protocol is not limited to a computer of a specific manufacturer, and the common-purpose data memory device can be used in common to one of computers (for example, a personal computer or information mobile terminal) of various manufacturers.

In this embodiment, the SCSI driver 132 together with the mass storage driver 134 (FIG. 3) is loaded. At this time, the SCSI driver 132 acquires information indicating that the projector 200 is a CD-ROM drive from the SCSI driver 232 of the projector 200. Accordingly, the file system module 130 transmits an SCSI command to the projector 200 through the SCSI driver 132, so that the projector 200 (disk image 224) can be used as a CD-ROM drive. The projector 200 is not required to be identified as a CD-ROM drive and may be identified as one of various data memory devices (for example, a DVD-ROM drive or a hard disk drive). In any case, reading data from the disk image 224 is performed by the file system module 130 and the SCSI driver 132. As described above, the whole of the file system module 130 and the SCSI driver 132 corresponds to a data read module according to an embodiment of the invention.

At the next step S120, the computer 100 executes an autorun program stored in the projector 200 which has been recognized as a CD-ROM drive. Accordingly, an image transmission program 500 recorded in the disk image 224 (in FIG. 3) is transmitted from the projector 200 to the computer 100 (step S124), and the image transmission program 500 is executed (step S128). Under the Windows operating system, when a file named as "Autorun.inf" is recorded in a root folder of the CD-ROM, an arbitrary program that is designated by the file is executed. Thus, in this embodiment, an image transmission program 500 recorded in the disk image 224 is executed using this feature.

However, depending on the configuration of the operating system, there is a case where the automatic execution feature of an autorun program is disabled. In addition, in some operating systems, the automatic execution feature is not available. In these cases, the computer 100 may acquire the image transmission program 500 from the projector 200 (disk image 224) according to a user's direction. Alternatively, instead of the image transmission program 500 stored in the projector 200, an image transmission program 500 which is recorded in a recording medium such as another CD-ROM or downloaded from the Internet may be used.

Figure 5:
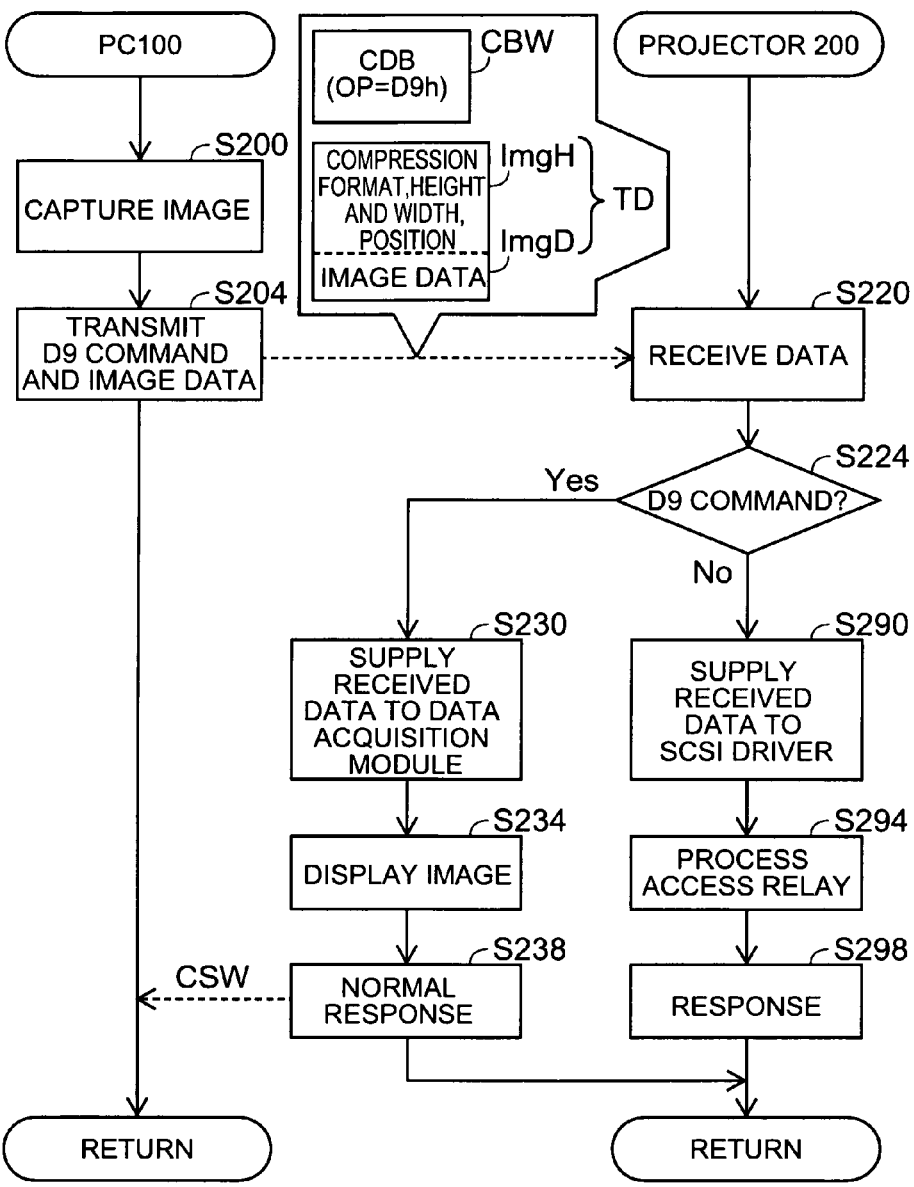
FIG. 5 is a flowchart showing a sequence of the image display process.

The started image transmission program 500 starts image display process using the projector 200. FIG. 5 is a flowchart showing a sequence of the image display process. In the first step S200, a capture module 510 (in FIG. 3) captures an image that is displayed by a display device 118 (in FIG. 2). Any method can be used as a method of capturing the image. For example, a GDI function for capturing an image may be called, or an API for drawing may be used. Alternatively, the capture module 510 may acquire image data directly from a VRAM 114. In the first embodiment, the whole display screen displayed by a display device 118 is captured.

Next, in step S204, a data generation module 520 generates display data using the captured image data that has been acquired by capture. In the first embodiment, display data is generated by compressing the captured image data. Any algorithm can be adopted as an algorithm for the compression. Alternatively, the display data can be generated without compression. This applies for other embodiments to be described later.

Next, the data generation module 520 issues to an SCSI wrapper module 530 a command requesting to send the display data. The SCSI wrapper module 530 generates a special SCSI command (hereinafter, referred to as "D9 command") for sending the display data according to this command. FIG. 6 is a diagram showing an example of the D9 command. The structure of the D9 command is similar to that of a command descriptor block (CDB) defined in the SCSI standards. That is because data communication with the projector 200 is performed using the mass storage driver 134 like the SCSI driver 132 (in FIG. 3).

The 0-th byte represents an operation code (hereinafter, referred to as OP code). The OP code is used for identifying a command, and a predetermined code is assigned in advance for each command such as read or write. In the first embodiment, to an SCSI command issued by the image transmission program 500, D9h (where h indicates a hexadecimal representation, hereinafter, h means the same, is assigned. Accordingly, when the OP code is D9h, it can be determined that the command is generated by the image transmission program 500. When the OP code is not D9h, it can be determined that the command is generated by the SCSI driver 132.

The OP code is not limited to D9h, and any other code may be used as the OP code for identifying an SCSI command issued by the image transmission program 500. However, preferably, a code that is different from an SCSI command for reading the data of the disk image 224 is used. In this case, the transmission of the image data and the reading the disk image 224 can be compatible. The command for reading the data represents a command for a series of processes from setting up communication to completing the reading data after the data memory device is connected to the interface. For example, the command includes an inquiry (inquiry) command and a read (READ) command.

The second byte denotes a UD command code. The UD command code is used for identifying a detailed content of a command issued by the image transmission program 500. When the image transmission program 500 generates a plurality of types of commands, the commands are identified based on the UD command codes. Accordingly, based on a combination of the OP code and the UD command code, a command issued by the image transmission program 500 can be identified. However, in a case where a command issued by the image transmission program 500 includes an image data transmission command only, the UD command code may be omitted.

The third to sixth bytes denote a data size of the transmission data. The data size indicates a data size of the transmission data transmitted following this SCSI command. As described below, since display data is transmitted following the D9 command, the data size is set to a size of the display data.

The seventh byte denotes a CE flag. The CE flag indicates continuation/discontinuation of transmission data. There is a case where data is divided into a plurality of parts of data for the transmission. In this case, a CE flag is set to "E" (end) in a D9 command for transmitting the last part of data, and the CE flags are set to "C" (continuation) in D9 commands for transmitting other parts of data. When data is transmitted without being divided, the CE flag is set to "E".

Other parts of the D9 command are set to predetermined values. These predetermined values are used for data communication in accordance with the SCSI standards (detailed description is omitted).

When the D9 command is generated, the SCSI wrapper module 530 issues this D9 command (CDB) and a command requesting to send display data to the mass storage driver 134. Then, the mass storage driver 134 generates a command block wrapper (CBW) for sending the D9 command. The CBW is data for sending an SCSI command using the mass storage class and stores the CDB. The mass storage driver 134 sends the CBW and the display data in this order by controlling the USB module 136.

In FIG. 5, the CBW and the display data TD to be sent are shown. The display data TD includes a header ImgH and a compressed image data ImgD. The header ImgH includes information on a compression type (algorithm), a height of the image (number of dots), a width of the image (number of dots), and a position of the image in the screen. The position of the image in the screen, for example, is represented by a position of a reference point (commonly a dot at upper-left corner) in the screen that is denoted by an image data ImgD. In the first embodiment, the display data TD is transmitted without being divided.

The computer 100 repeatedly performs capturing an image (S200) and transmitting the CBW (D9 command) and the display data TD (S204) that are described above.

The projector 200 receives the CBW (D9 command) and the display data TD from the USB module 236 and the mass storage driver 234 (step S220). In the following step S224, a dispatcher 226 determines whether the OP code of an SCSI command that is stored in the CBW is D9h. When the OP code is D9h, in the following step S230, the dispatcher 226 supplies received data to the data acquisition module 244. In the supplied data, an SCSI command and data that has been transmitted with the SCSI command (that is, the CBW and the display data TD) are included. In the following step S234, the data acquisition module 244 extracts the display data TD and supplies the extracted display data to the image decompression module 242. The image decompression module 242 decompresses the image data ImgD according to the type of the compression that is defined in the header ImgH. The image decompression module 242 controls an image processor 214 (in FIG. 2) based on the information (height, width, and position) of the header ImgH and the decompressed image data, and the image data is decompressed in a display memory (not shown) in the image processor 214 by the image processor 214. At this time, the image decompression module 242 may perform a process of resolution conversion based on the resolution (the number of pixels) of the projector 216 and information of the header ImgH.

As a result described above, the projector 200, as shown in FIG. 1, can display an image on the projection display screen 70. As described above, the image display module 240 displays an image based on the image data received by the projector 230. Accordingly, as the computer 100 repeatedly performs transmitting of the image data, the image displayed by the projector 200 is repeatedly updated.

In the following step S238, the data acquisition module 244 issues to the mass storage driver 234 a command requesting to send a response that indicates a normal receipt of the display data TD. Then, the mass storage driver 234 generates a command status wrapper (CSW) for sending the response. The CSW is data for sending a status response of the SCSI status using the mass storage class. The mass storage driver 234 sends a CSW by controlling the USB module 236.

On the other hand, when the OP code is not D9h (S224: No), in the following step S290, the dispatcher 226 supplies the data that has been received to the SCSI driver 232. In the supplied data, an SCSI command and data that is sent with the command are included. However, when only an SCSI command is received, the dispatcher supplies only the SCSI command (for example, when a read command is issued). In the following step S294, the data management module 230 relays an access to the disk image 224 according to an SCSI command which is received through the SCSI driver 232 (for example, data stored in the disk image 224 is sent to the computer 100). The SCSI driver 232, the data management module 230, and the disk image 224 collectively correspond to a data storage unit according to an embodiment of the invention.

In the following step S298, the data management module 230 sends a status response that indicates an execution result of a command to the computer 100. The process for the status response is performed similarly to step S238. When the image transmission program 500 is sent to the computer 100, the steps S290 to S298 are performed.

As described above, the first embodiment has various features and advantages to be described below. The first advantage is in that the projector 200 is identified as a general-purpose device (mass storage class) other than a projector.

The USB module 236 of the projector 200 sends identification information (device class (interface class)) indicating a general-purpose device to the computer 100. Accordingly, it becomes possible to perform data communication (transmission of image data) through USB interface units 112 and 212 using a general-purpose mass storage driver 134 without installing a dedicated device driver in the computer 100 for the projector 200. The USB module 236, the mass storage driver 234, and the dispatcher 226 in the projector 200 collectively correspond to a communication controller of an image display device according to an embodiment of the invention. The USB module 136 and the mass storage driver 134 in the computer 100 collectively correspond to a communication controller of an image supply device according to an embodiment of the invention.

The second advantage of the first embodiment is in that the projector 200 is identified as a data memory device (mass storage class). A communication protocol of the mass storage class is designed not to excessively decrease the transmission speed reaching the data memory device. Accordingly, it becomes possible to increase the update frequency of the display image of the projector 200 by increasing the transmission speed of the image data.

The third advantage of the first embodiment is in that the image transmission program 500 is stored in the data storage unit (disk image 224) of the projector 200. Accordingly, the image transmission program 500 can be easily provided to the computer 100. As a result, the preparation of the image transmission program 500 can be easily performed, thereby more improving the convenience of the projector 200 in using.

B. Second Embodiment

Figure 7:
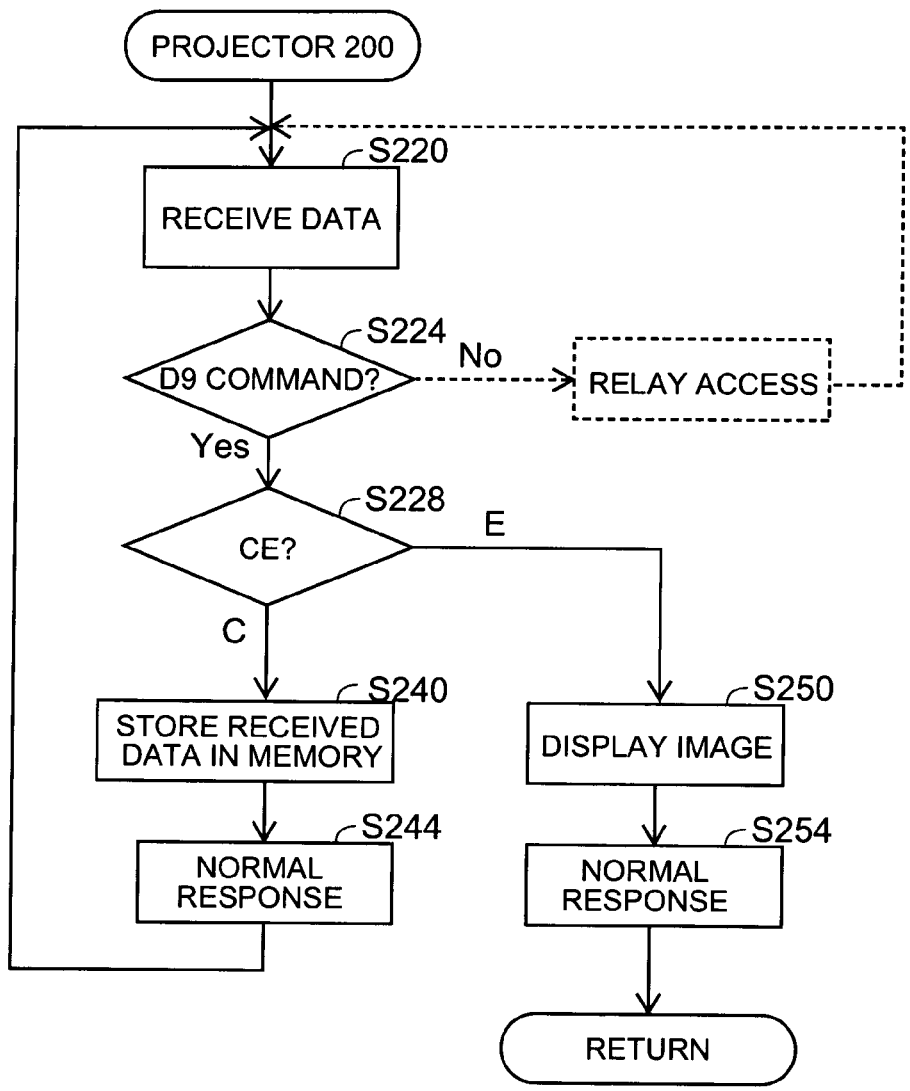
FIG. 7 is a flowchart showing a sequence of the image display process according to a second embodiment of the invention.

FIG. 7 is a flowchart showing a sequence of image display process according to a second embodiment of the invention. In FIG. 7, procedures performed by the projector 200 are shown. In the second embodiment, different from the first embodiment shown in FIG. 5, a data generation module 520 divides a captured image data into a plurality of parts of the data and sends the parts of the data to the projector 200 orderly one by one. The configuration of the device is the same as the first embodiment shown in FIGS. 1 to 3.

The procedures in steps S220 and S224 are the same as those in the steps S220 and S224 shown in FIG. 5, respectively. A data acquisition module 244 that has received a D9 command checks a value of the CE flag (FIG. 6) (S228). When the CE flag is set to "C", the data acquisition module 244 stores the received part of the data in a RAM 206 (FIG. 2) (S240) and issues a normal response (S244). The step S244 is the same as the step S238 of FIG. 5. Then, the process is returned to the step S220, and the data acquisition module 244 waits for the remaining part of the data.

When the last part among the plurality of parts of the data is sent, the CE flag is set to "E". In this case, in the following step S250, the data acquisition module 244 combines the received plurality of parts of the data to reconfigure the display data and supplies the display data to an image decompression module 242. Then, the image decompression module 242 controls an image processor 214 (FIG. 2) based on a header and the image data, similarly to the step S234 of FIG. 5. As a result, the projector 200, as shown in FIG. 1, displays an image on a projection display screen 70. The following step S254 is the same as the step S238 of FIG. 5. After the step S254, the process is returned to step S220. The series of processes described above are repeatedly performed.

Figure 8:
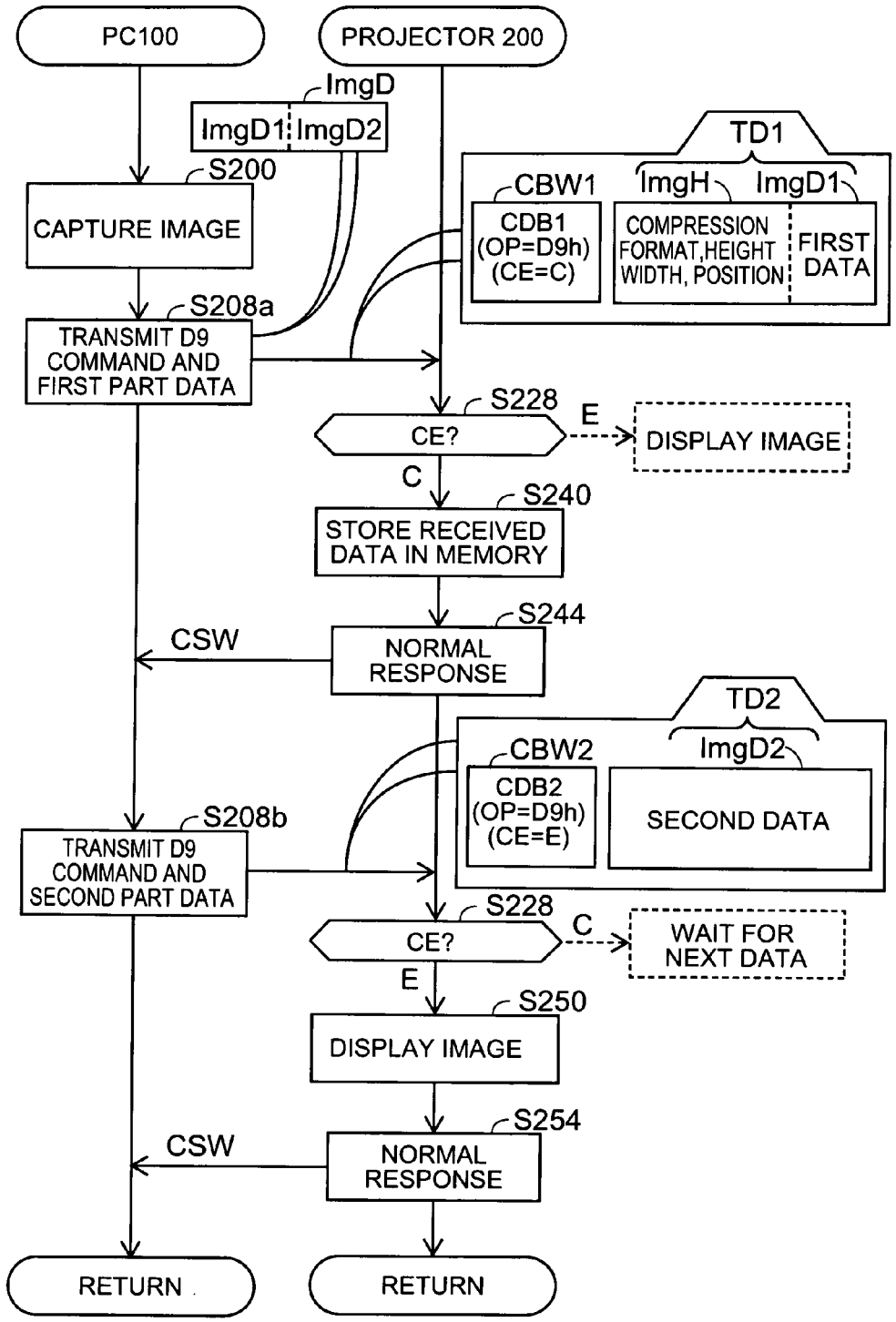
FIG. 8 is a flowchart showing a detailed exemplary sequence of the image display process according to the second embodiment of the invention.

FIG. 8 is a flowchart showing a detailed exemplary sequence of image display process according to the second embodiment of the invention. In this example, a case where the image data is divided into two parts of data for the transmission is shown.

The first step S200 is the same as the step S200 of FIG. 5. In the following step S208a, a data generation module 520 (FIG. 3) generates an image data ImgD for sending by compressing the captured image data and generates a first display data TD1 using the image data ImgD. The data generation module 520 divides the image data ImgD into a first part data ImgD1 and a second part data ImgD2. The data generation module 520 generates a first display data TD1 including a header ImgH and the first part data ImgD1.

Next, the data generation module 520 sets the CE flag to "C" and issues a command for requesting to send the first display data TD1 to an SCSI wrapper module 530. In the D9 command (CDB1) that is generated by the SCSI wrapper module 530, an OP code is set to D9h and the CE flag is set to "C".

A command block wrapper CBW1 that stores the generated D9 command (CBD1) and the first display data TD1 are sent to the projector 200 by a mass storage driver 134.

In the projector 200 that has received the data, since the CE flag of the received D9 command is set to "C, the same series of processes as the steps S228, S240, and S244 of FIG. 7 are performed.

In the computer 100, since a normal response (CSW) which has been issued in the step S244 is received, the data generation module 520 (FIG. 3) issues a command requesting to send the remaining second part data ImgD2 to the SCSI wrapper module 530 (S208b). At this time, a command setting the CE flag to "E" is issued. In the D9 command (CDB2) that has been generated by the SCSI wrapper module 530, the OP code is set to D9h, and the CE flag is set to "E".

A command block wrapper CBW2 that stores the generated D9 command (CDB2) and a second display data TD2 (the second part data ImgD2) are sent to the projector 200 by the mass storage driver 134.

In the projector 200 that has received data, since the CE flag of the received D9 command is set to "E", the same series of processes as the steps S228, S250 and S254 of FIG. 7 are performed.

Although the case where the image data is divided into two parts of data for being sent was described as above, in a case where the image data is divided into three or more parts of data for being sent, the parts of data are sent sequentially in the same sequence, all parts of data are sent, and then, the image is displayed.

As described above, in the process of image display according to the second embodiment of the invention, the image data is divided for being sent. Accordingly, even when the size of the image data is large, the whole image data can be appropriately sent to the projector 200. In interfaces for communication, there are many cases where there is a limitation in data size that can be sent per one command. In these cases, the whole image data can be sent regardless of the size.

In the example of FIG. 8, the image data ImgD for sending is divided for being sent, but any one of various other methods can be used as a method of dividing the image data for sending. For example, the display screen may be divided into a plurality of part screens, and the captured image data for each part screen may be sent. For example, the display screen of the display device 118 may be divided into two part screens of the left half part and right half part. Here, a series of processes including sending the image data of the left part screen to the projector 200, updating the left half part by the projector 200, sending the image data of the right part screen, and updating the right half part by the projector 200 may be repeatedly performed. Here, the projector 200 may update the display after transmission of the captured image data of the whole display screen is completed. The division of the screen is not limited to the division of left half and right half parts, and any one of other division methods may be used. Moreover, a method of dividing into three or more regions may be used.

C. Third Embodiment

Figure 9:
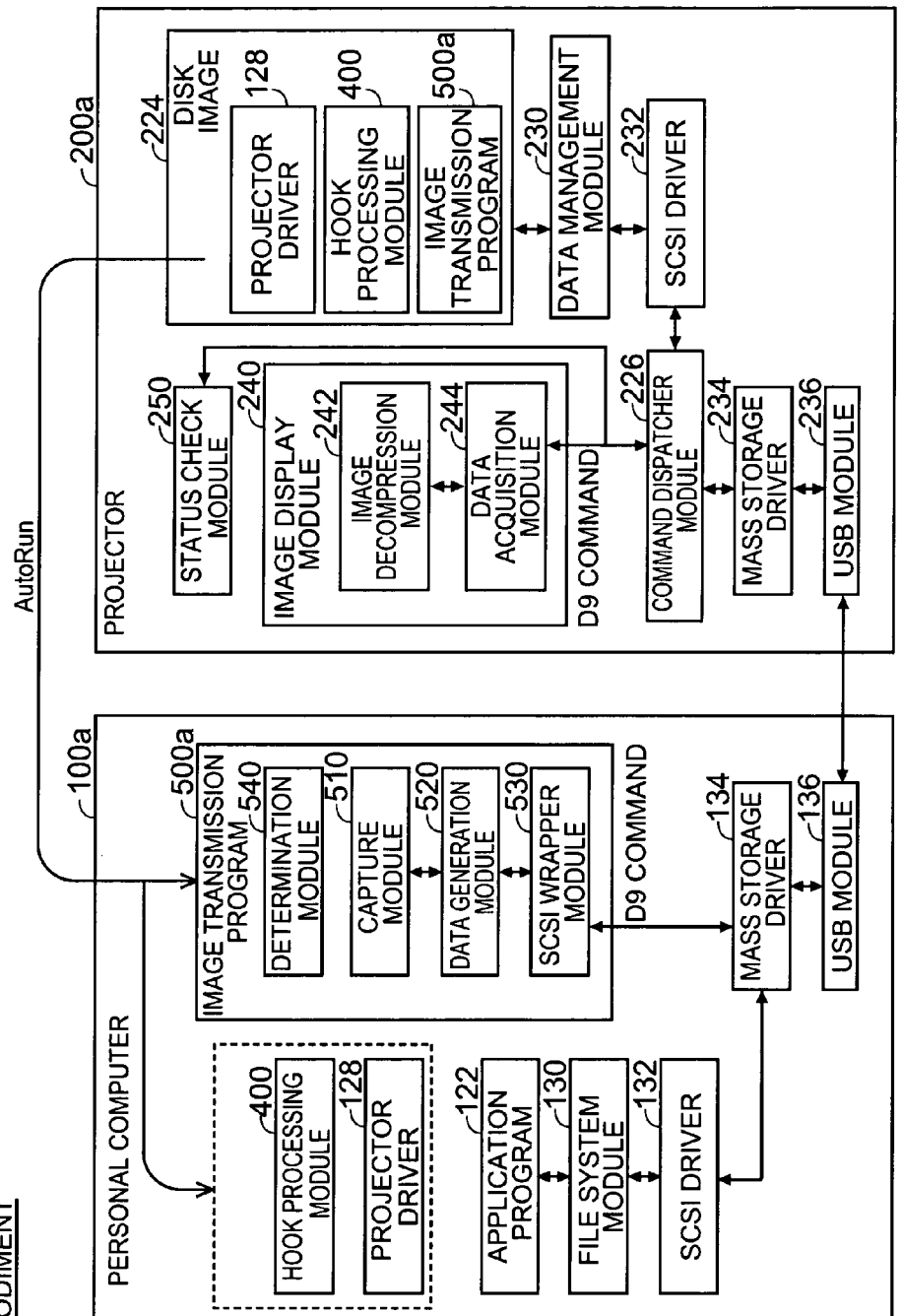
FIG. 9 is a block diagram showing a detailed configuration of software according to a third embodiment of the invention.

FIG. 9 is a block diagram showing a detailed configuration of software according to a third embodiment of the invention. There are three differences between the third embodiment and the first embodiment shown in FIG. 3. The first difference is in that an image transmission program 500a according to the third embodiment includes a determination module 540. The second difference is in that a hook process module 400 and a projector driver 128 are operated on a computer 100a according to the third embodiment. The third difference is in that a status check module 250 is operated on a projector 200a according to the third embodiment. Other configurations are the same as those of the first embodiment shown in FIG. 3. In the third embodiment, only a changed region of the screen is transferred from the computer 100a to the projector 200a due to the added components. The programs 500a, 400, and 128 that operate on the computer 100a are stored in a disk image 224. According to an auto-run program in a connection process shown in FIG. 4 or a user's direction, the image transmission program is transferred from the projector 200a to the computer 100a.

The configuration of hardware is the same as that of the first embodiment shown in FIGS. 1 and 2.

Figure 10:
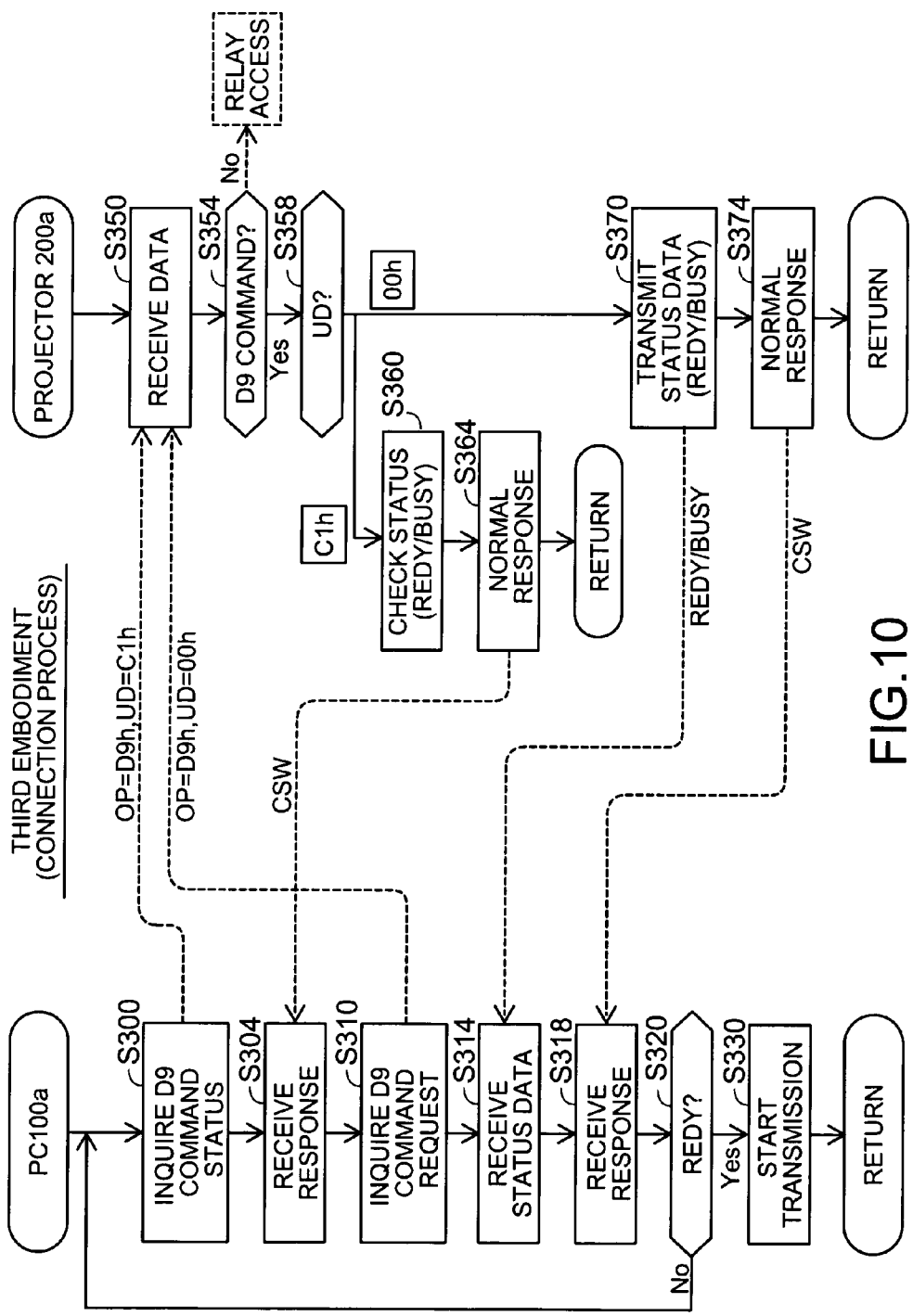
FIG. 10 is a flowchart showing a sequence of connection process according to the third embodiment of the invention.

FIG. 10 is a flowchart showing a sequence of connection process according to the third embodiment of the invention. The process shown in FIG. 10 is performed after the connection process shown in FIG. 4. The connection process is performed so that the computer 100a can wait for the completion of the preparing to receive the image data of the projector 200a. The reason for waiting for the completion of the preparing to receive of the projector 200a is as follows. In the third embodiment, as described below, after the image data for the whole screen is sent for the first time, image data only for a part, of which image is changed is sent. Accordingly, for ensuring that the projector 200a receives the first time image data for the whole screen, the computer 100a waits for the completion of the preparation of the receiving of the projector 200a.

In the first step S300, the determination module 540 (FIG. 9) issues to the SCSI wrapper module 530 a command for requesting to send a status inquiry to the projector 200a. The SCSI wrapper module 530 generates a D9 command for sending a status inquiry, like a case where the image data is sent. Here, the UD command code (FIG. 6) is set to a code different from the UD command code as an image data transmission command. For example, in the third embodiment, 80h is used for the Image data transmission command, and C1h is used for a command for sending a status inquiry. The generated D9 command is sent by the mass storage driver 134 to the projector 200a. When an inquiry is made using the D9 command (UD command code=C1h) that is used for the status inquiry for any one of various other statuses in addition to the receiving status, data identifying a content of the inquiry may be sent following the D9 command.

When the dispatcher 226 of the projector 200a receives an SCSI command (S350) it is determined whether the command is the D9 command (S354) When the command is the D9 command, the UD command code is checked additionally (S358) When the UD command code is C1h, the received data is supplied to the status check module 250. When the UD command code is 80h, although not shown in FIG. 10, the dispatcher 226 supplies the received data (D9 command for image data transmission and display data) to the data acquisition module 244.

The status check module 250 that has received a D9 command (that is, status inquiry) of which a UD command code is set to C1h determines whether the projector 200*a* is in a status in which image data can be received (S360). As a condition for determining that the image data can be received, any condition under which the received image data can be maintained without any loss can be used. For example, a condition in that the image display module 240 (FIG. 9) has been started may be used. Alternatively, a condition in that the image processor 214 (FIG. 2) has been started may be used. The status check module 250 stores the status data indicating a determination result in the RAM 206 (FIG. 2) as data to be sent to the computer 100*a*. In this embodiment, the status data is one of the strings between READY (receivable) or BUSY (unreceivable).

Next, the status check module 250 sends the computer 100*a* a response that indicates that the status inquiry has been normally received (S364). The sending of the response is performed as same as the step S238 in FIG. 5. In this step, the status data is not sent to the computer 100*a*, since the projector 200*a* corresponds to a target of the SCSI, and accordingly, the projector cannot send data spontaneously.

The determination module 540 of the computer 100*a* issues a command for requesting to send a request inquiry to the SCSI wrapper module 530 (S310) upon receiving a normal response (CSW) (S304). This request inquiry is a command for sending several data to the projector 200*a*. The SCSI wrapper module 530 generates a D9 command like a case when the image data is sent. Here, the UD command code (FIG. 6) is set to a code that is different from any one of the codes for an image data sending command and a status inquiry sending command. For example, in the third embodiment, the request inquiry sending command is set to 100h. The generated D9 command is sent to the projector 200*a* by the mass storage driver 134.

When the received SCSI command is a D9 command (S354: Yes) and the UD command code is 00h, the dispatcher 226 of the projector 200*a* supplies the received data to the status check module 250.

The status check module 250 in a status that the D9 command (that is, request inquiry) of which the UD command code is set to 00h is received issues to the mass storage driver 234 a command requesting to send the status data which has been stored in the memory in a previous step S360 (S370). The mass storage driver 234 sends the status data to the computer 100*a* according to this command. In the following step S374, the status check module 250 sends the computer 100*a* a response indicating that the data sending according to the request inquiry is performed normally. This response is performed the same as the step S364.

The status data and the response received by the computer 100*a* are supplied to the determination module 540 (S314 and S318). When the status data is "BUSY", the determination module 540 repeatedly performs a series of processes of steps S300 to S320 until status data that is set to "REDY" is received.

When the status data is "REDY", the determination module 540 issues a direction for starting the image display process to each module 510, 520, and 530 in the following step S330.

Figure 11:
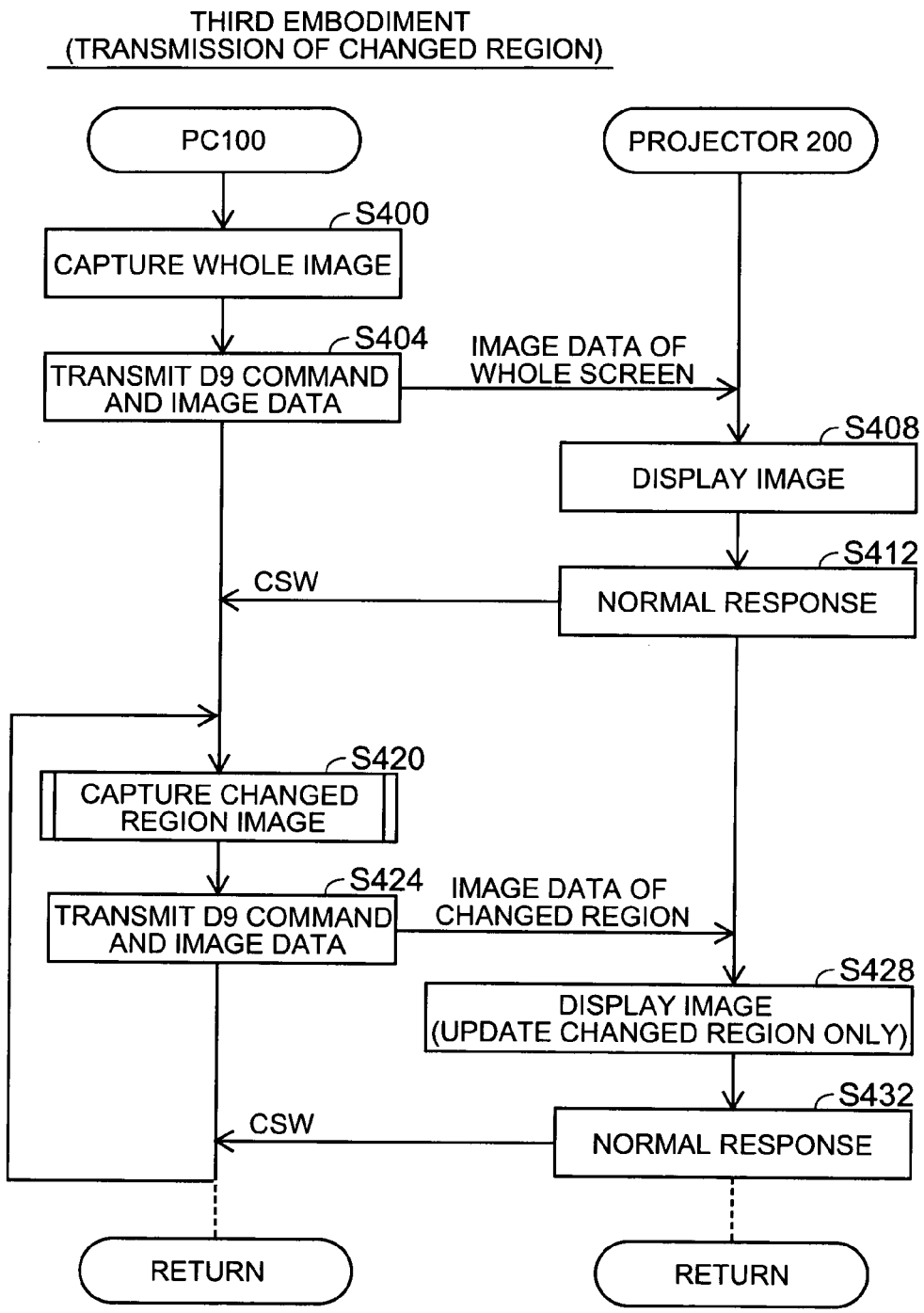
FIG. 11 is a flowchart showing a sequence of the image display process in the third embodiment.

FIG. 11 is a flowchart showing a sequence of the image display process in the third embodiment. The steps S400, S404, S408, and S412 in the first part are the same as the steps S200, S204, S234, and S234, respectively. In step S400, the whole display screen displayed by the display device 118 is captured. Accordingly the projector 200*a*, as shown in FIG. 1, can display an image on the projection display screen 70. In the flowchart in FIG. 11, the checking processes for the OP code and the UD command code are omitted.

In the following step S420, the capture module 510 performs to capture only a changed region of the screen. The capture of the changed region only will be described later. In the following step S424, as in the step S404, the captured image data is sent from the computer 100*a* to the projector 200*a*. At this time, a size (height and width) and position in the header are set to values indicating the changed region.

In the following step S428, the image decompression module 242, as same as in the step S408, controls the image processor 214 (FIG. 2) according to the header and the image data. At this time, only the image data for a part that represents the changed region is updated. The image data for the other parts is maintained without being updated. As a result, the projector 200*a* can display an image, of which a changed region is updated. The following step S432 is the same as the step S412. After the step S432 is performed, the process is returned to the step S420. Thereafter, a series of processes of the steps S420 to S432 described above are repeatedly performed.

As described above, in the third embodiment, after the whole display screen is sent, only the changed region is sent. When the image decompression module 242 receives only the changed region, only the changed region is updated. Accordingly, the amount of data to be sent can be reduced. As a result, it becomes possible to increase the update frequency of the image displayed by the projector 200*a*.

In the example of FIG. 11, the transmission of the image data for the whole screen is performed only once right after the connection (S400 and S404), the image data of the whole screen may be transmitted several times after the connection. Accordingly, the distortion of the image displayed by the projector 200*a* can be suppressed. For example, the image transmission program 500*a* may regularly transmit the image data for the whole screen. Alternatively, the image transmission program 500*a* may transmit the image data for the whole screen upon a user's direction.

Figure 12:
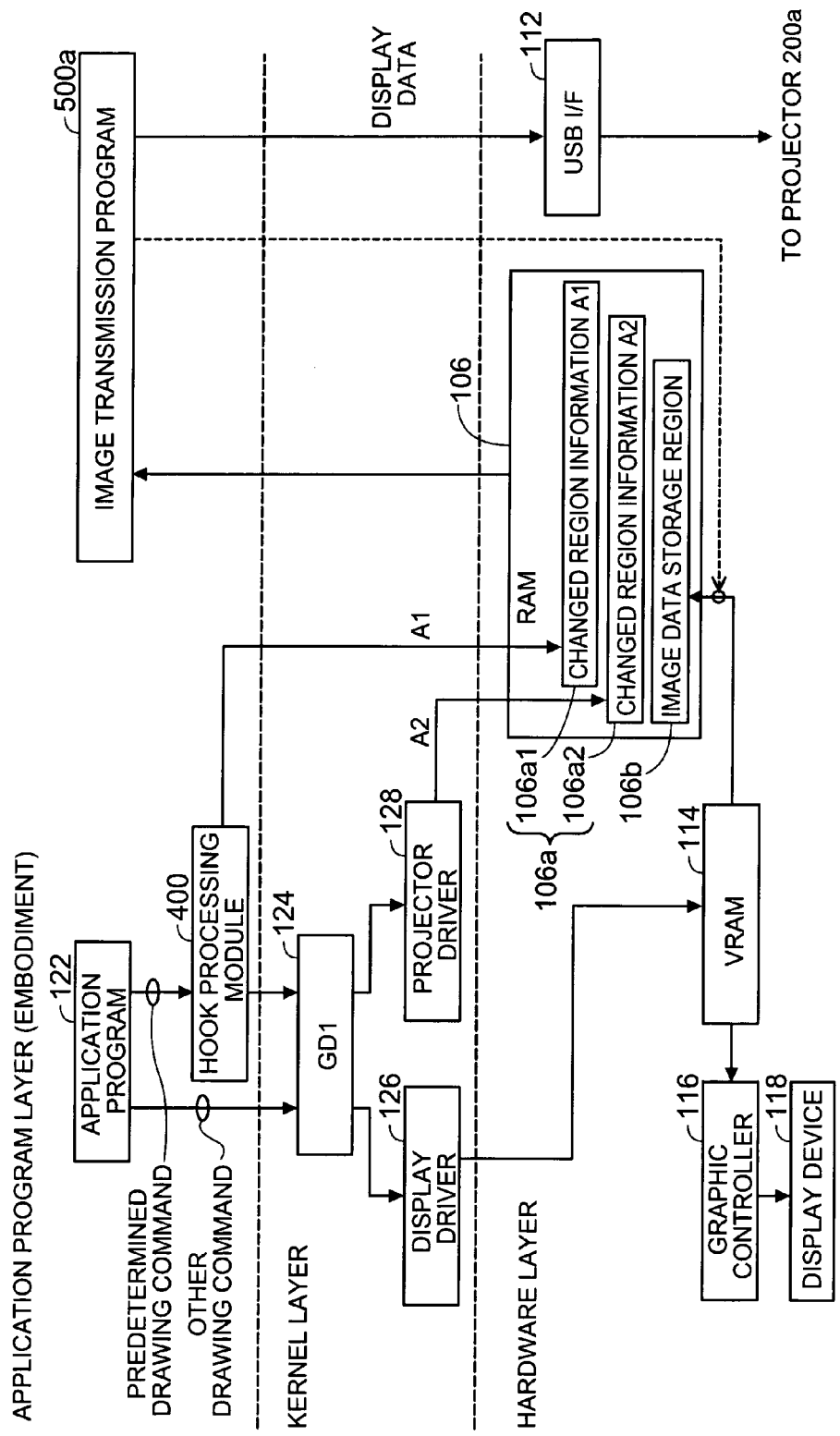
FIG. 12 is a block diagram showing a hierarchy of software and hardware of a computer for capturing a changed region in the screen.

Next, the capture (S420 in FIG. 11) of only the changed region will be described. FIG. 12 is a block diagram showing a hierarchy of software and hardware of a computer for capturing a changed region in the screen. The application program 122 and the image transmission program 500*a* belong to an application program layer (also referred to as a user application program layer). The GDI 124, the display driver 126, and the projector driver 128 belong to a kernel layer. The RAM 106 as a general-purpose memory, the USB interface unit 112, the VRAM 114, the graphic controller 116, and the display device 118 belong to hardware layer.

Between the application program 122 and the GDI 124, a hook processing module 400 is prepared. The hook processing module 400 hooks predetermined drawing commands which are issued by the application program 122 for advanced fetching and then the process to be described later will be performed. Other drawing commands are performed by the GDI 124, as is common. Preferably, the hook processing module 400 may be configured to be dedicated to each application program so as to hook only a predetermined appropriate drawing command based on the application program 122.

In the third embodiment, a case where a presentation program (for example, PowerPoint of Microsoft Corporation) is used as the application program 122 will be described. In the first place, a case where the drawing command is transmitted directly to the GDI 124 not through the hook processing module 400 will be described, and next, a case where the drawing command is fetched in advance by the hook processing module 400 will be described.

The application program 122 issues a drawing request, for example, for an image of a presentation sheet included in a presentation file to the GDI 124. Generally, in the drawing request, information on the image output device (that is, whether the image is output to a display device or a printing device) is included.

Alternatively, one of other general-purpose APIs for drawing may be used instead of the GDI 124. The general-purpose API for drawing means an API that is commonly used for a plurality of application programs.

The GDI 124, the display driver 126, and the projector driver 128 altogether serve as a drawing module that performs drawing according to a drawing command. In more details, the GDI 124 receives a drawing request transmitted from the application program 122, checks the output device of the image based on the drawing request, and transmits the drawing request to each one of the display driver 126 and the projector driver 128 when the output device is a display device.

The display driver 126 draws the image data in the VRAM 114 according to the received drawing request. As is well known, the drawing request is not limited to a request for drawing of the whole screen, and therefore a drawing request for a part of the screen is frequently used. When a drawing command for drawing a part of the screen is received, the display driver 126 draws only an mage part of a region (also called a changed region) that is defined as a drawing target in the VRAM 114. The graphic controller 116 displays an image in a display device 118 based on the image data (that is, bit map data) drawn in the VRAM 114. The projector driver 128 stores changed region information 106a that indicates the position and size of the drawing target region (that is, a changed region) in the VRAM 114 in the RAM 106 according to the drawing request received form the GDI 124. Hereinafter, the changed region information stored by the projector driver 128 may also be referred to as a second changed region information 106a2 (changed region information A2).

Figure 13A:
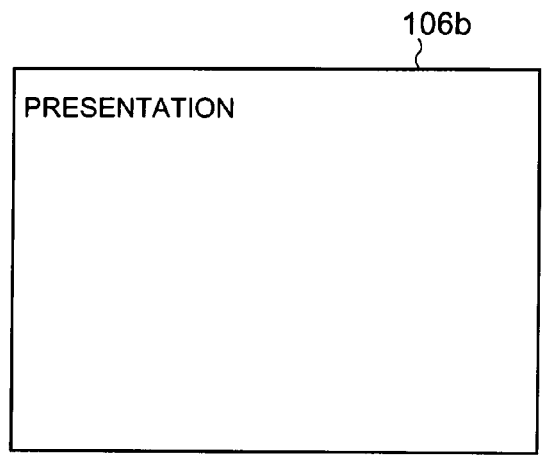
FIGS. 13A and 13B are diagrams showing examples of changed region information and an image data storage region according to an embodiment of the invention.
Figure 13B:
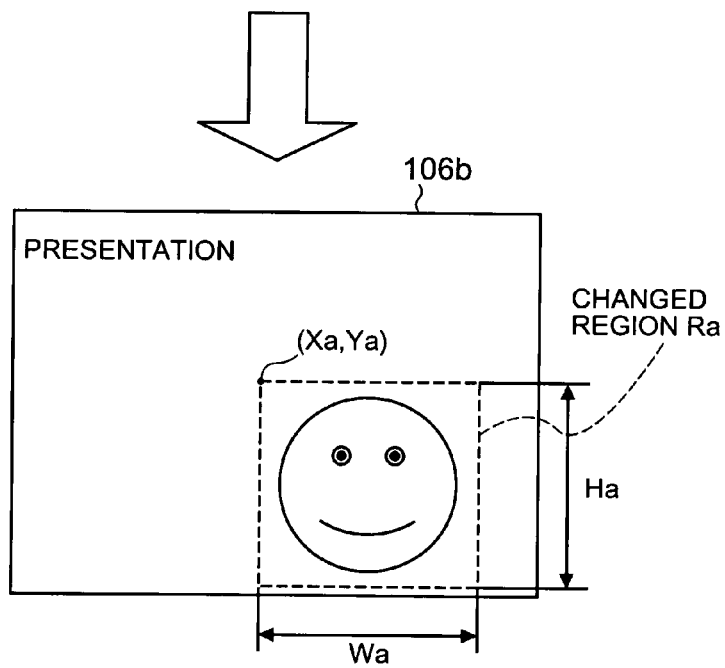

FIGS. 13A and 13B are diagrams showing examples of the changed region information 106a2 and the image data storage region 106b in the RAM 106. Here, it is assumed that an image to be projected and displayed on the projector changes like FIGS. 13A to 13B. As described below, in the image data storage region 106b, the image data that has been transmitted from the VRAM 114 by the capture module 510 is stored. Preferably, the image data storage region 106b has the same data amount as the VRAM 114 (frame memory).

The changed region Ra is a region of an image part drawn according to a drawing command at a time when the image is changed from FIG. 13A to FIG. 13B. The changed region information 106a2 on the changed region Ra includes an x coordinate Xa and a y coordinate Ya of a reference point (generally, a left-top point) and a width Wa and a height Ha of the changed region Ra. A coordinate (Xa and Ya) of the reference point is data indicating the position of the changed region Ra, and the width Wa and the height Ha collectively are data indicating the size of the changed region Ra.

The capture module 510 transmits the image data for the changed region Ra from the VRAM 114 to the image data storage region 106b in the RAM 106 with reference to the changed region information 106a2 in the RAM 106. This image data storage region 106b is a memory region, for example, having a size corresponds to the display resolution of the computer 100 or the projector 200. The capture module 510 reads image data for the changed region Ra from the image data storage region 106b and supplies the read image data and the changed region information 106a2 to the data generation module 520. The data generation module 520 generates display data (a header and image data) using the received data. The generated display data is transmitted to the projector 200a by the mass storage driver 134.

As described above, in a case where the drawing command is transmitted directly to the GDI 124 not through the hook processing module 400, the image data stored in the VRAM 114 is transmitted to the RAM 106 that is a general-purpose memory, and then the image data stored in the RAM 106 is transmitted to the projector 200a. As a result, a considerable time is required for transmitting the image data from the VRAM 114 to the RAM 106, thus a sufficient transmission speed may not be acquired.

Next, a case where a drawing command is fetched in advance by the hook processing module 400 will be described. The hook processing module can be considered as a kind of an API for drawing, but the hook processing module is different from a general-purpose API for drawing such as the GDI 124. In other words, the hook processing module 400 is configured to typically process only a predetermined drawing command, but the GDI 124 is configured to process all the commands for drawings unlike the hook processing module.

The hook processing module 400, for example, loaded (installed) into an application program 122 as a DLL. Generally, an application program operates in units of processes. During execution of an application program, a plurality of modules (GDI32.dll, Kernel32.dll, or the like) are loaded into the process, thus the application program performs various operations by using functions in the modules. The loading of the hook processing module 400 means installing a module 400 into which a hook procedure is mounted into a process of an application program 122.

When the hook processing module 400 is loaded, an address of a function of a predetermined drawing command issued from an application program 122 is replaced with an address of a function for performing a specific function that is mounted in the hook processing module 400. In the specific function, storage of the changed information and the image data in the RAM (to be described later) is performed, and then a general GDI function is executed. When the hook processing module 400 is unloaded, the address of the function which has been replaced upon loading is restored, and then the hook processing module 400 which has been loaded in the process is unloaded.

The hook processing module 400 can be loaded/unloaded in/from an application program 122 any time as needed. Preferably, the image transmission program 500a is configured such that the hook processing module 400 is loaded in a predetermined application program 122 (presentation program in this embodiment) that is in operation when an image transmission program 500a is started and the hook processing module 400 is unloaded when the image transmission program 500a ends. In this case, the hook processing module 400 can be operated only for a period that the image transmission program 500a is operated, and accordingly the drawing command is hooked when the image transmission program 500a is not in operation (has not started) on the computer 100, thereby an undesired result can be avoided. The clause "the image transmission program 500a is executed on a computer 100" according to an embodiment of the invention means the process of the image transmission program 500a is started.

Figure 14:
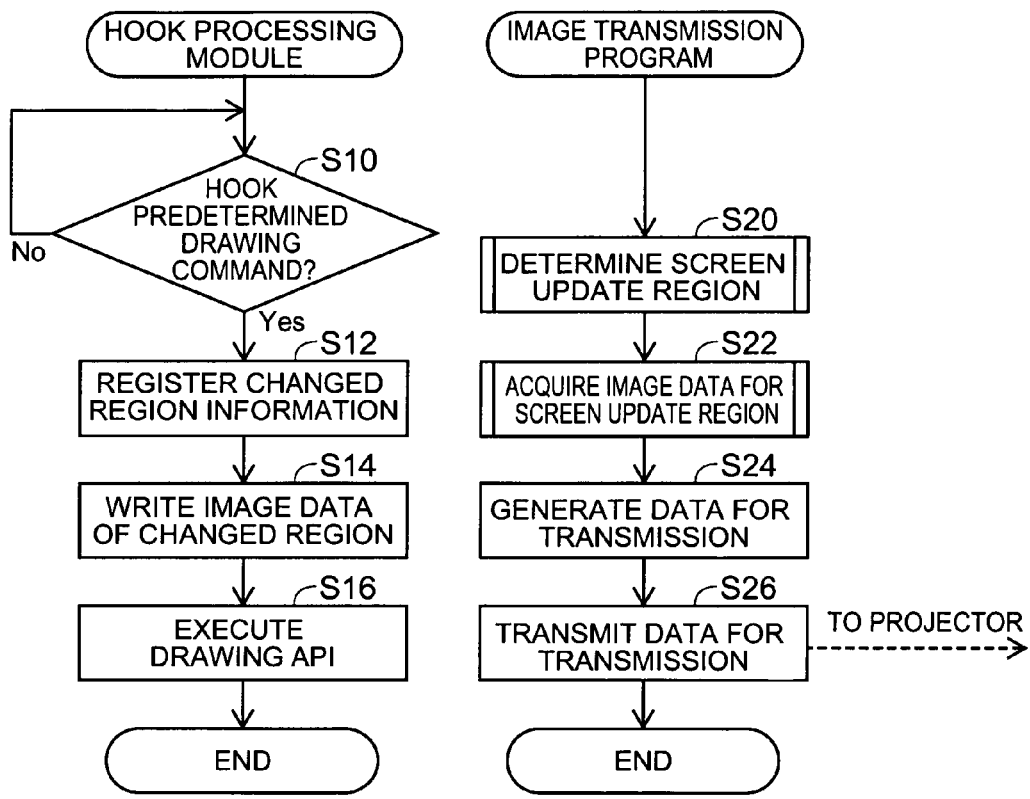
FIG. 14 is a flowchart showing operations of the hook processing module 400 and the image transmission program 500a according to the third embodiment of the invention.

FIG. 14 is a flowchart showing operations of the hook processing module 400 and the image transmission program 500a according to the third embodiment of the invention. The steps S10 to S16 are performed by the hook processing module 400, and the steps S20 to S26 are regularly performed by the image transmission program 500a.

When a predetermined drawing command is issued from an application program 122, the hook processing module 400 acquires the drawing command instead of the GDI 124 by hooking the drawing command in step S10. Preferably, drawing commands which are hooked by the hook processing module 400 are limited to predetermined limited drawing commands rather than all the drawing commands. The reason is in that there is a possibility of reducing the processing speed or being incapable of performing desired drawing when all the drawing commands are hooked, since there are a plurality of drawing commands issued by the application program 122.

In step S12, a process for registering the changed region information is performed according to the acquired drawing command. Described in more details, the hook processing module 400 acquires the position and the size of a region (changed region Ra in FIG. 13B) in which drawing is performed according to the drawing command and directly stores the changed region information 106a1 (hereinafter, also referred to as the changed region information A1) which indicates the changed region in the RAM 106.

In step s14, image data for the changed region Ra is stored. Described in more details, the hook processing module 400 decompresses the image data in the changed region Ra according to the drawing command and directly stores the image data in the image data storage region 106b of the RAM 106.

In step S16, the hook processing module 400 calls a general GDI function according to the drawing command acquired in the step S10 for performing a drawing process. The display driver 126 and the projector driver 128 (FIG. 12) perform each process according to the drawing command received from the GDI 124, like a case where the drawing command is directly transmitted to the GDI 124 not through the hook processing module 400. In other words, the display driver 126 draws an image in the VRAM 114 and the projector driver 128 stores the changed region information A2 that indicates the drawing region in the RAM 106.

Figure 15:
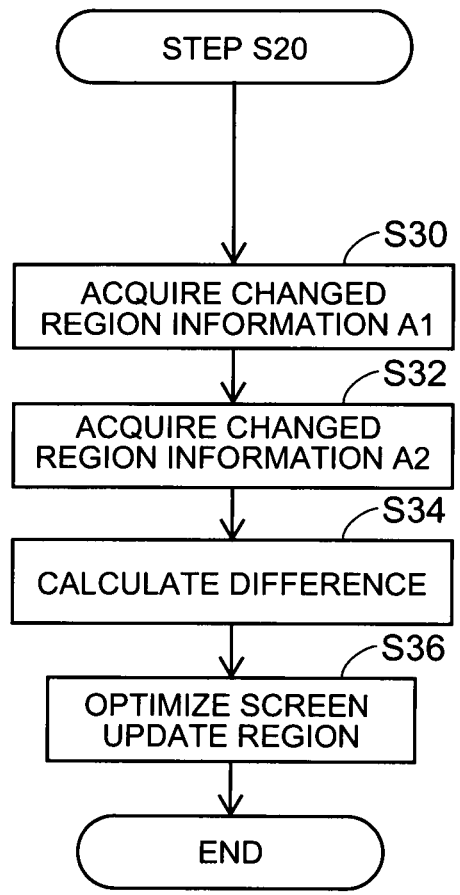
FIG. 15 is a flowchart showing a detailed sequence of the step S20.

The capture module 510 determines a region (hereinafter, referred to as a screen update region) of the image data to be transmitted to the projector 200. FIG. 15 is a flowchart showing a detailed sequence of the step S20. In steps S30 and S32, the first and second changed region information A1 and A2 are acquired. As described above, the first changed region information A1 indicates a region drawn by the hook processing module 400 in the image data storage region 106b of the RAM 106 and is stored in the RAM 106 by the hook processing module 400. The second changed region information A2 indicates a region drawn by the display driver 126 in the VRAM 114 and is stored in the RAM 106 by the projector driver 128.

Figure 16A:
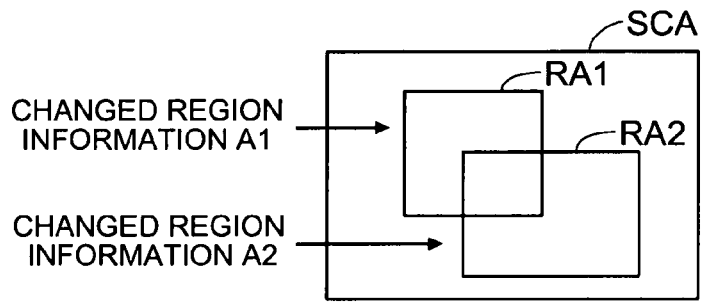
FIGS. 16A to 16D are diagrams showing relationship between a changed region and a screen update region according to the third embodiment of the invention.

FIG. 16A is an example of two changed regions RA1 and RA2 as represented as two changed region information A1 and A2. Here, two changed regions RA1 and RA2 are arranged in a same screen region SCA. Here, the screen region SCA means the whole region of the image stored in the VRAM 114 and is the same as the whole region of the image data storage area 106b. To be more specific, the first changed region RA1 is a region defined by an address in the image data storage region 106b, and the second changed region RA2 is a region defined by an address in the VRAM 114. The first and second changed regions RA1 and RA2 can be represented as the same screen region SCA.

In the example of FIG. 16A, two changed regions RA1 and RA2 are partly overlapped, but the two changed regions RA1 and RA2 may have different relative positions with each other. For example, the two changed regions RA1 and RA2 may not be overlapped with each other at all or may be completely overlapped with each other. For example, when the hook processing module 400 performs drawing according to a specific drawing command, and then, a general drawing module 124, 126 or 128 performs drawing in the same region according to the same drawing command, the two changed regions RA1 and RA2 become the same. However, even when the same drawing command is executed, there may be a slight difference between the two changed regions RA1 and RA2 according to a configuration of each module.

Figure 16B:
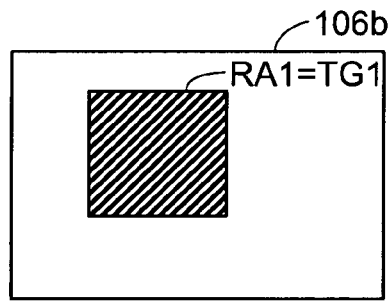
Figure 16C:
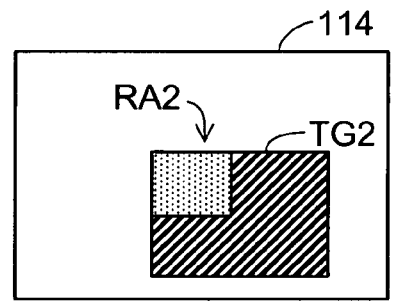
Figure 16D:
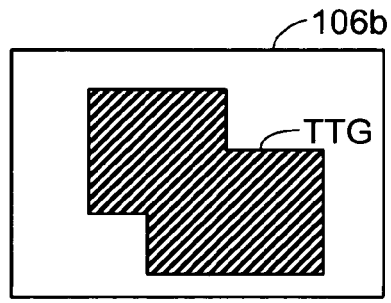

FIG. 16B indicates a region TG1 in which an image is directly acquired from the RAM 106 when the capture module 510 performs capture. FIG. 16C indicates a region TG2 in which an image is directly acquired from the VRAM 114. The regions TG1 and TG2 are called transmission regions. As can be understood from this example, the image of the first changed region RA1 (=TG1) is acquired directly from the RAM 106. The image of a region TG2 of the second changed region RA2 that is not included in the first changed region RA1 is acquired from the VRAM 114. The reason for the distinction between the regions is to minimize an image that is acquired from the VRAM 114, thereby minimizing a time required to acquire the image. For example, when the two changed regions RA1 and RA2 are completely overlapped with each other, there is no need to acquire an image from the VRAM 114, and accordingly, the transmission process can be performed at high speed. FIG. 16D indicates the whole region (screen update region) TTG which is acquired by the capture module 510. This screen update region TTG corresponds to a sum region of the first and second changed regions RA1 and RA2.

In the first changed region information A1, a plurality of information corresponding to a plurality of drawing commands may be included. In this case, the sum region of drawing regions corresponding to the plurality of drawing commands becomes the first changed region RA1. This applies to the second changed region RA2 in the same way.

In the step S34 of FIG. 15, the capture module 510 calculates a difference between the changed regions RA1 and RA2 represented by two types of changed region information A1 and A2. To be more specific, a region TG2 (FIG. 16C) of the second changed region RA2 that is not included in the first changed region RA1 is calculated. In step S36, optimization of the screen update region TG2 (FIG. 16C) is performed by the capture module 510.

Figure 17A:
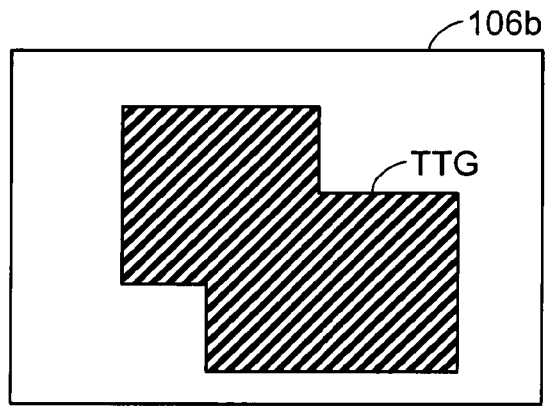
FIGS. 17A and 17B are diagrams showing an optimization process on a screen update region.
Figure 17B:
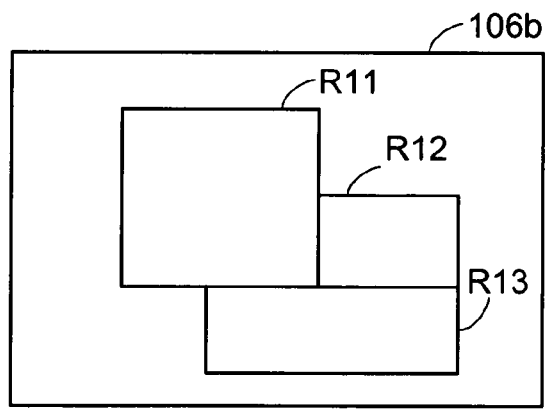

FIGS. 17A and 17B are diagrams showing an optimization process of the screen update region. FIG. 17A represents a screen update region TTG like FIG. 16D. In the optimization process, as shown in FIG. 17B, the screen update region TTG is divided into adjacent rectangular regions R11 to R13 that are not overlapped with each other. The rectangular regions R11 to R13 are employed as a screen update region after the optimization. Since each one of the screen update regions R11 to R13 is rectangular, it is possible to reduce the amount of image data to be transmitted when compared to a case where rectangular images including the screen update region TTG before the optimization are transmitted.

Figure 18:
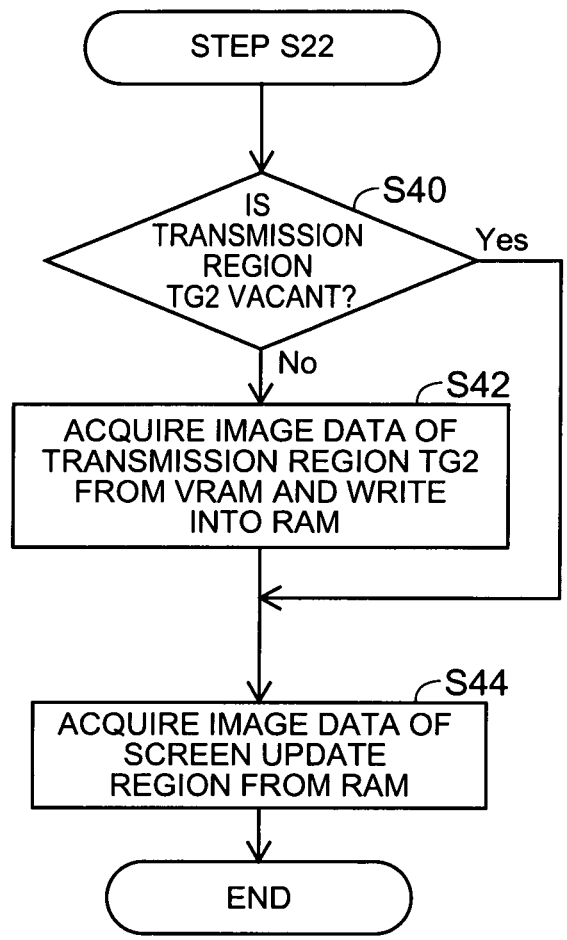
FIG. 18 is a flowchart showing a detailed sequence of the step S22.
Figure 19A:
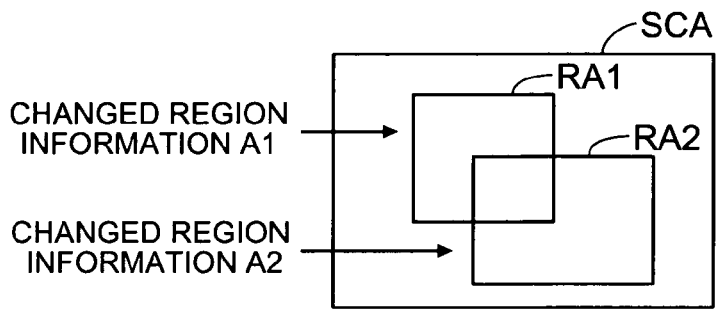
FIGS. 19A to 19D are diagrams showing a relationship between a changed region and a screen update region according to a fourth embodiment of the invention.
Figure 19B:
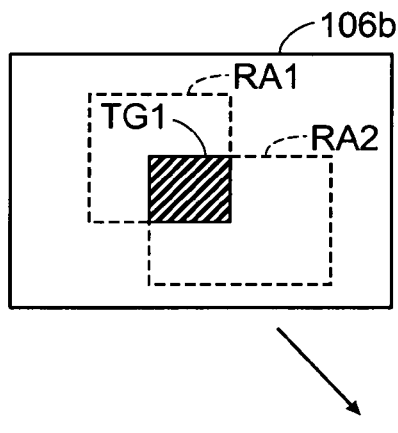
Figure 19C:
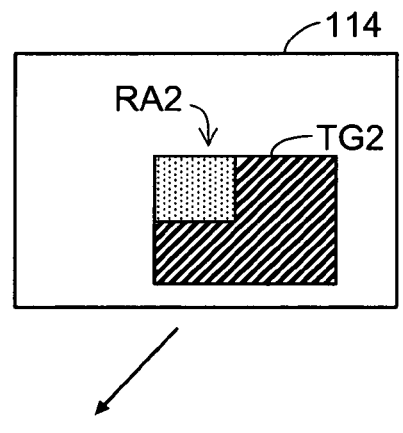
Figure 19D:
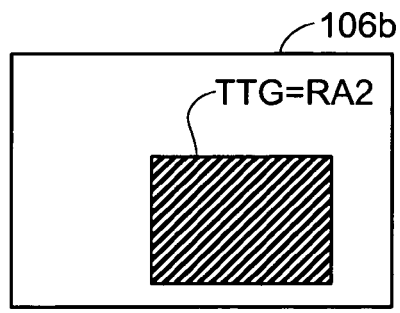

In step S22 of FIG. 14, image data of an image part corresponding to a screen update region is acquired by the capture module 510. FIG. 18 is a flowchart showing a detailed sequence of the step S22. In step S40, it is checked whether a second transmission region TG2 (FIG. 16C) is vacant. The second transmission region TG2 is vacant when the second changed region information A2 does not exist or the second changed region A2 is completely included in the first changed region A1. When the second transmission region TG2 is vacant, the process is moved to the step S44 described later. On the other hand, when the second transmission region TG2 is not vacant the process is moved to the step S42. In the step S42, the capture module 510 acquires the image data of the second transmission region TG2 from the VRAM 114 and writes the acquired image data into the image data storage region 106b of the RAM 106. As a result, in the image data storage region 106b, all the images in the screen update region TTG shown in FIG. 16D are stored. In step S44, the capture module 510 acquires image data of the screen update region TTG from the image data storage region 106b of the RAM 106. The image data of each screen update region R11, R12, or R13 (FIG. 10B) after the optimization is acquired actually.

In step S24 of FIG. 14, the capture module 510 supplies the changed region information and the image data to the data generation module, 520. The data generation module 520 generates display data using the received data. In step S26, the generated display data is transmitted to the projector 200a through the USB interface unit 112. When the screen update region is divided into a plurality of part regions by the optimization process, display data is generated for each part region. Each display data may be arranged in one D9 command and then transmitted. Alternatively, each display data may be transmitted as one D9 command.

The image decompression module 242 of the projector 200a (FIG. 9) updates an image displayed by the projector 200a by controlling the image processor 214 according to the received display data (header and image data).

As described above, in the third embodiment, the hook processing module 400 fetches a predetermined drawing command in advance by hooking the drawing command and directly writes the image data of the changed region in the RAM 106. As a result, a time required to transmit the image data from the VRAM 114 to the RAM 106 can be saved. Accordingly, there is an advantage in that the transmission speed of image data to the projector 200a can be sufficiently fast.

In a general personal computer, the data transmission from a RAM 106 to VRAM 114 can be performed at a very high speed, but commonly the data transmission from the VRAM 114 to the RAM 106 can be performed at a speed several times slower than the speed described above due to its architecture. In the third embodiment, the low-speed data transmission from the VRAM to the RAM can be omitted, and accordingly, it is possible to markedly reduce a time required to transmit the image data to the projector 200.

In the third embodiment, an image part for a region TG2 (FIG. 16C) that is not drawn by the hook processing module 400 is acquired from the VRAM 114 and transmitted to the projector 200a. As a result, it is possible to transmit an image drawn by a general drawing module 124, 126, or 128 to the projector 200 without any loss.

D. Fourth Embodiment

FIGS. 19A to 19D are diagrams showing a relationship between a changed region and the screen update region according to a fourth embodiment of the invention. FIGS. 19A to 19D correspond to FIGS. 16A and 16D in the third embodiment. The unit configuration and process flow of the fourth embodiment are the same as that of the third embodiment, but a region to be transmitted in the fourth embodiment is different from that in the third embodiment. To be more specific, in the fourth embodiment, a first transmission region TG1 (FIG. 19B) of which an image is directly acquired from the RAM 106 is set to a part in which the first and second changed regions RA1 and RA2 are overlapped with each other. In other words, the first transmission region TG1 is set to a region of the second changed region RA2 which is included in the first changed region RA1. A second transmission region TG2 (FIG. 19C) of which image is acquired from the VRAM 114 is set to a part of the second changed region RA2 which is not included in the first changed region RA1, like in the third embodiment. Accordingly, the screen update region TTG (FIG. 19D) that is the whole region to be transmitted is the same as the second changed region RA2.

As described above, in the fourth embodiment, an image in the second changed region RA2 of which image is drawing by the GDI 124 and the display driver 126 in the VRAM 114 is transmitted by the image transmission program 500a. The reason for performing the process described above is as follows. In other words, since a drawing command that has been hooked by the hook processing module 400 is executed again by a GDI 124 and a display driver 126, basically all the drawing commands are executed by the GDI 124 and the display driver 126. Accordingly, when an image of the second changed region RA2 is transmitted it is possible to enable the projector 200a to display a correct image. However, in this case, when all the image data is acquired from the VRAM 114, there occurs a problem in that a considerable time is required for data transmission. Thus, in the fourth embodiment, by directly acquiring from the RAM 106 image data for a part of the second changed region RA2 that is included in the first changed region RA1, the time required to acquire data is shorten. The fourth embodiment is preferable in that the amount of image data to be transmitted in the fourth embodiment is less than in the first embodiment.

In most cases, a region (first changed region RA1) that is drawn by the hook processing module 400 and a region (second changed region RA2) that is drawn by the GDI 124 and the display driver 126 coincide with each other. Accordingly, as in the fourth embodiment, when image transmission of a part of the first changed region RA1 which is not included in the second changed region RA2 is omitted, there is a negligible possibility in that a problem occurs in an image displayed on the projector 200a. To the contrary, in the third embodiment described above, an image for a part of the first changed region RA1 which is not overlapped with the second changed region RA2 is transmitted, and accordingly, there is an advantage in that more flawless image can be transmitted even when the first and second changed regions RA1 and RA2 are quite different from each other.

The image transmission program 500a may be configured to use selected one among a plurality of transmission modes including a transmission process of the third embodiment (also referred to as a first transmission mode) and a transmission process of the fourth embodiment (also referred to as a second transmission mode). The transmission mode may be selected by a user, or alternatively, the image transmission program 500a may select the transmission mode automatically based on the process capability (process speed of CPU or transmission speed of a bus) of a computer 100a (generally image supply device). Accordingly, it is possible to select a transmission mode in which a desirable image can be transmitted at an appropriate transmission speed.

E. Fifth Embodiment

Figure 20:
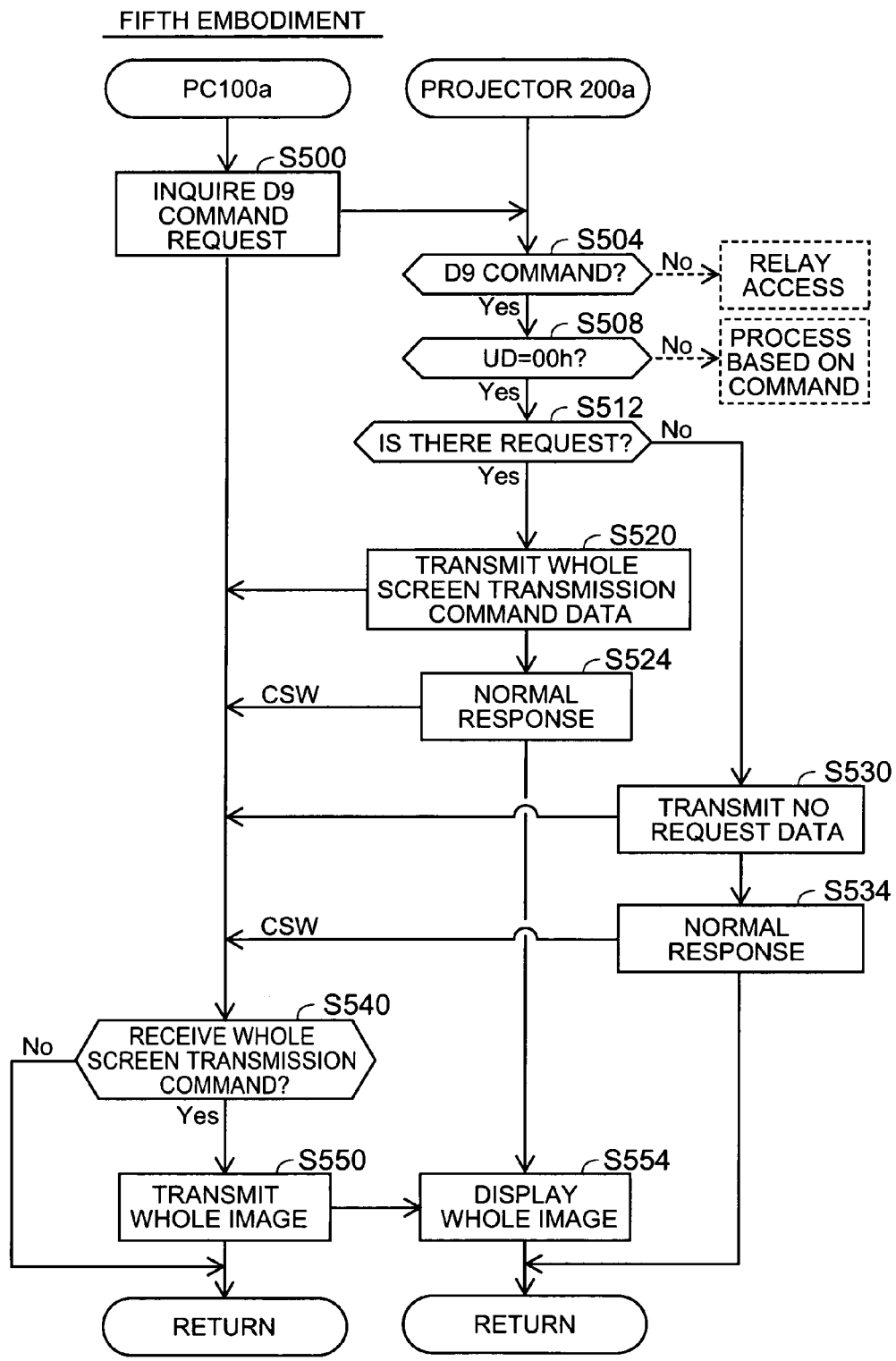

In the third and fourth embodiments described above, it may be configured that the projector 200a can request for image data for the whole screen to the computer 100*a*. FIG. 20 is a flowchart showing a processing sequence for the request.

In the first step S500, a determination module 540 (FIG. 9) issues a request inquiry. This process is the same as the step S310 in FIG. 10.

Since the OP code of the received SCSI command is D9h and the UD command code is 00h (S504: Yes, S508: Yes), the dispatcher 226 (FIG. 9) of the projector 200*a* supplies the received data to the status check module 250. When the UD command code is other than 00h, a process according to the UD command code is performed (for example, when the UD command code is 80h, an image display process is performed). On the other hand, when the OP code is other than D9h, a process according to the OP code is performed (for example, an access relay process for a disk image 224 is performed.

The status check module 250 searches for data to be transmitted to the computer 100*a* in the RAM 206 (FIG. 2) upon receiving a request inquiry (S512). In the fifth embodiment, the status check module 250 stores command data representing a whole screen transmission command in the RAM 1206 (FIG. 2) as data to be transmitted when receiving a direction for acquiring the whole screen from a user through the input unit 210 (FIG. 2). The direction for acquiring the whole screen may be issued by the user when deterioration of the screen displayed by the projector 200*a* occurs.

When the command data is detected from the RAM 206, the status check module 250 transmits the detected command data to the computer 100*a* and transmits a normal response to the computer 100*a* (S520 and S524). On the other hand, when data to be transmitted is not detected, the status check module 250 transmits data indicating that there is no request to the computer 100*a* and transmits a normal response to the computer 100*a* (S530 and S534). The steps S520 and S530 are performed as same as the step S370 in FIG. 10, and the steps S524 and S534 are performed as same as the step S374 in FIG. 10.

The data received by the computer 100*a* is supplied to the determination module 540. When the determination module 540 receives a whole screen transmission command (S540: Yes), the determination module 540 issues a direction for transmitting image data for the whole screen to each module 510, 520, or 530. As a result, the image data for the whole screen is transmitted to the projector 200*a* (S550), and accordingly, a correct whole screen is displayed by the projector 200 (S554). On the other hand, when the whole screen transmission command is not received (S540:No), the determination module 540 ends the process.

The determination module 540 regularly performs a series of processes for the steps S500 to S550 described above. The series of the processes are performed between a time when the computer 100*a* receives a response for the completion of the display data transmission (for example, the step S238 in FIG. 5) and a time when the transmission of the next display data starts (for example, the step S204 in FIG. 5).

As described above, in the fifth embodiments since the image transmission program 500*a* transmits the image data for the whole screen upon a request from the projector 200*a*, a convenience of a user can be improved.

A request transmitted from the projector 200*a* to the computer 100*a* is not limited to the request for the image data for the whole screen, and any other request can be made. For example, a request for changing an operational configuration of the image transmission program 500*a* (for example, a transmission frequency of image data) may be made. Alternatively, the status check module 250 may be configured to issue a plurality of types of requests. In this case, the information for identifying a request is transmitted to the computer 103*a*. Generally, the determination module 540 performs a predetermined process according to the request identification information. Here, when the projector 200*a* can transmit data spontaneously, the request inquiry performed by the determination module 540 may be omitted. The status check module 250 may automatically issue a request when there is no direction from the user. For example, the status check module 250 may regularly issue a request for whole screen transmission. The input unit 210 (FIG. 2) that receives direction from a user is not limited to a device including operational buttons, and a device which receives a direction through a remote controller operated by the user may be used as the input unit 210.

F. Modified Example

In each embodiment, a component among the components other than a component claimed as an independent claim is an additional component and may be omitted appropriately. The present invention is not limited to the embodiments or examples described above, and various changes in form and details may be made therein without departing from the spirit and scope of the present invention. For example, the following modifications can be made.

Modified Example 1

In each embodiment described above, the device type of the projector 200 or 200*a* that is identified by the computer 100 or 100*a* is not limited to a mass storage class, and various types (classes) for general-purpose devices may be used. In the classes for the general-purpose devices, communication protocols are standardized, and therefore the data communication between the image supply device and the image display device can be easily performed. Drivers of the classes described above are usually widely spread and are installed in many devices having a USB interface in advance. Accordingly, the data communication between the image supply device and the image display device can be performed without installing a dedicated driver. In addition, development of a dedicated driver can be omitted. As a result, it becomes possible to reduce efforts to use an image display device.

Preferably, a class that is designed not to excessively lower the speed of data transmission between the computer 100 or 100*a* and the projector 200 or 200*a* is used. For example, any one among Audio, Mass Storage, and Communication Device may be used.

An embodiment of the present invention may be applied to a future version of USB. The interface is not limited to the USB, and various general-purpose interfaces that can be connected to a plurality of types of general devices may be used. In any case, preferably, the projector 200 or 200*a* is identified as a general-purpose device. Here, a general-purpose device means a device that performs data communication using a standard protocol for interface. As a standard protocol, a protocol standardized by a standard institute of the interface may be used, and a protocol that is substantially a standard in the industry may be used.

Modified Example 2

In each embodiment described above, the disk image 224 (FIGS. 3 and 9) may be omitted. In this case, a program that is executed on the computer 100 or 100*a* may be acquired from the Internet or other recording medium. When a data memory unit (for example, a disk image 224) which can be accessed from the computer 100 or 100a is arranged in the projector 200 or 200a like in each embodiment described above, a plurality of data stored in the data memory unit can be provided to the computer 100 or 100a. At this time, preferably, the communication command used for the transmission of display data is a predetermined command other than a command for reading data in the data memory unit among commands used as a communication protocol for data memory device. In this case, the transmission of the display data and the reading in the data memory unit can be compatible.

When a command (for example, write command) other than any one between a command of the commands used for communication protocol in the data memory device which is used for reading data and a command (especially, a transmission command of display data) issued by the image transmission program 500 is issued, the projector 200 or 200a may be configured to perform any arbitrary process. For example, the dispatcher 226 may transmit a response indicating an error to the computer 100 or 100a. Alternatively, the dispatcher 226 may supply the received data to the SCSI driver 232, so that data management module 230 can respond.

As data that is stored in the memory region in advance, any data such as an operational guide of the projector 200 or 200a may be used. Preferably, as in each embodiment, a program for implementing a function of transmitting image data (display data) to the projector 200 or 200a into the computer 100 or 100a is used. Accordingly, a program for transmitting the image data can be easily provided to the computer 100 or 100a, so that the efforts to use the projector 200 or 200a can be reduced. Any program selected among the programs (modules) used for transmitting the image data may be stored in the memory region. For example, any module that is installed in the computer 100 or 100a as a standard may be omitted. In the examples of FIGS. 9 and 12, when the projector driver 128 is installed in the computer 100a as a standard, the projector driver 128 of the disk image 224 may be omitted.

Modified Example 3

In each embodiment described above, the method of capturing a changed region is not limited to a method that is used in the third embodiment shown in FIGS. 12 to 18 or a method that is used in the fourth embodiment shown in FIGS. 19A to 19D, and any method can be used. For example, a changed region may be detected by continuously monitoring the VRAM 114 using the capture module 510. In this case, the capture module 510 acquires image data for the changed region from the VRAM 114. An optimization process described with reference to FIGS. 17A and 17B may be omitted. In this case, the capture module 510 captures an image having a rectangular shape such as an image including a screen update region TTG before optimization. As described above, the captured image may be larger than the changed region. However, it is preferable that the captured image is a partial image including the changed region of the whole screen.

As the display data that is supplied from the computer 100 or 100a to the projector 200 or 200a, any data other than the display data used in the embodiments described above may be used. For example, any data including at least the image data may be used as the display data. To be described in more details, for example, when the image data for the whole screen is transmitted, a header (changed region information) is not required to be transmitted.

Preferably, the display data may include at east information indicating the position and size of the changed region (screen update region) and the image data in the changed region. The reason is that when only the data related to the changed region (changed region information and the image data for the changed region) is transmitted, the amount of data to be transmitted can be reduced.

Modified Example 4

In each embodiment described above, the screen that is displayed by the projector 200 or 200a is not limited to a screen displayed by the display device 118, and any other screen may be used. For example, only an image drawn by a predetermined application that operates in the computer 100 or 100a may be displayed on the projector 200 or 200a. In this case, the capture module 510 may capture an image drawn by the application.

Modified Example 5

In each embodiment described above, an SCSI command set is used. Accordingly, when various data (for example, the status data in the step S370 of FIG. 10 or the command data in the step S520 of FIG. 20) is transmitted from the projector 200 or 200a to the computer 100 or 100a, the size of data is determined by the computer 100 or 100a which corresponds to an SCSI initiator (in each embodiment described above, the data size is set to a predetermined value). Here, when the data size for transmission is large, a part of the data may remain in the projector 200 or 200a. In this case, the size of the remaining data is written in data which is transmitted to the computer 100 or 100a, and the computer 100 or 100a repeatedly performs the process of transmitting data to the projector 200 or 200a until the whole remaining data is received.

Modified Example 6

The communication sequence for transmitting the display data, the status data, or the command data is not limited to the sequence in each embodiment described above, and any sequence may be used. For example, in the step S26 of FIG. 14, the display data may be divided for the transmission like an example shown in FIG. 8. In each embodiment described above, an SCSI command set is used for data communication, but any command set for data communication may be used. Any sequence of the data communication that is appropriate for the used command set may be used.

Modified Example 7

In each embodiment described above, a partial image for the second transmission region TG2 (shown in FIGS. 16C and 19C) is acquired from the VRAM 114, the acquired partial image is written in the image data storage region 106b of the RAM 106, and then, the image for the screen update region TTG is acquired from the RAM 106 for transmission through the interface, but the process of writing the image data into the image data storage region 106b may be omitted. However, according to the sequence in the embodiments described above, an image can be acquired from one image data storage region 106b for final image transmission, and accordingly, there is an advantage in that the process can be simple.

Modified Example 8

In each embodiment described above, the drawing module is divided into three modules including the GDI 124, the display driver 126, and the projector driver 128, but any other method of dividing the module may be used, and the functions implemented in the modules may be arranged in one module. In addition, the functions of the display driver 126 and the projector driver 128 may be arranged in one module.

Modified Example 9

In each embodiment described above, a personal computer is used as the image supply device, but instead of the personal computer, any other kind of a computer (a mobile computer, a handheld computer, or a workstation) may be used. Alternatively, any device having an interface and a same function as a computer other than a computer may be used. The devices for example, includes an information mobile terminal, a cellular phone, a mail terminal, a game device, and a set top box. As an image display device, any display device other than a projector may be used.

Modified Example 10

A part of the function that is implemented in software in each embodiment described above may be implemented in hardware, and a part of the function that is implemented in hardware may be implemented in software.

The entire disclosure of Japanese Patent Application No. 2006-085913, filed Mar. 27, 2006 is expressly incorporated by reference.

What is claimed is:

1. An image display device which is connected to a general-purpose interface connectable to a plurality of types of general-purpose devices as an interface for a computer and displays an image based on image data supplied from the computer, the image display device comprising:
    a communication controller that controls data communication through the interface; and
    an image display unit that displays an image based on the image data,
    wherein the communication controller transmits identification information, which indicates that the image display device is a mass storage device, to the computer for starting the data communication, and
    wherein the communication controller receives the image data from the computer as the mass storage device and supplies the received image data to the image display unit for display.

2. The image display device according to claim 1, wherein the interface is a USB interface, and
    wherein the identification information is configured to a mass storage class.

3. The image display device according to claim 2, further comprising a data memory unit that can be accessed by the computer,
    wherein the communication controller (i) supplies received data to the data memory unit when receiving a communication command for reading data as a communication command used in communication based on the mass storage class and (ii) supplies received data to the image display unit as image data when receiving a predetermined communication command other than a communication command for reading data.

4. The image display device according to claim 3, wherein the data memory unit stores an image transmission program for implementing a function of transmitting the image data to the image display device using communication according to the mass storage class into the computer.

5. The image display device according to claim 4, wherein the image transmission program implements a function of transmitting update image data which represents a partial region of a current image including a changed region into the computer for displaying an image in which only a partial region is changed from a current image to be displayed by image data which has been transmitted on the image display device.

6. The image display device according to claim 2, further comprising a USB port.

7. The image display device according to claim 1, wherein the image display unit updates only a partial region when receiving update image data that represents only the partial region of a current image to be displayed based on image data which has been received.

8. The image display device according to claim 7, wherein
    the partial region is defined as a region where the image data changed between receipt of previous image data and receipt of the update image data.

9. The image display device according to claim 1, wherein
    the communication controller includes a mass storage driver that uses a mass storage class communication protocol for communication with the computer, and operates the image display device as the mass storage device.

10. The image display device according to claim 1, wherein
    the communication controller is configured to identify the image display device as the mass storage device.

11. A computer which supplies image data to an image display device receiving the image data as a mass storage device for displaying images, the computer comprising:
    a general-purpose interface that can be connected to a plurality of types of general-purpose devices as an interface to which the image display device is connected;
    a communication controller that controls data communication through the interface by identifying the image display device as the mass storage device; and
    an image transmission processing module that transmits the image data for display to the image display device identified as the mass storage device by controlling the communication controller.

12. The computer according to claim 11, wherein
    the interface is a USB interface, and
    wherein the communication controller identifies the type of the image display device as a mass storage class.

13. The computer according to claim 12, wherein the image display device further comprises a data memory unit which can be accessed by the computer, the computer further comprising:
    a data read module that reads data stored in the data memory unit by using a communication command for reading data as a communication command which is used in communication based on the mass storage class,
    wherein the image transmission processing module transmits the image data using a predetermined communication command other than the communication command for reading data.

14. The computer according to claim 12, further comprising a USB port.

15. The computer according to claim 11, wherein
    the image transmission processing module has a function of transmitting update image data which represents only a partial region of a current image including a changed region for displaying an image in which only a partial region is changed from a current image to be displayed by image data which has been transmitted on the image display device.

16. The computer according to claim 15, further comprising:
- an application program that can issue a drawing command of an image;
- a drawing module for processing the drawing command which is issued by the application program; and
- a hook processing module which hooks a predetermined drawing command issued by the application program for fetching the drawing command in advance and draws an image in a predetermined image storage region for transmission included in a general-purpose memory based on the acquired drawing command,
- wherein the image transmission processing module has a function of acquiring an image from the image storage region for transmission and transmitting the acquired image to the image display device through the interface,
- wherein the hook processing module has functions of writing a first changed region information representing a first changed region which is a region in the image storage region for transmission in which an image is drawn based on the predetermined drawing command into the general-purpose memory and supplying the drawing command to the drawing module after processing the predetermined drawing command,
- wherein the drawing module has functions of drawing an image in the frame memory based on a drawing command received from the application program or the hook processing module and writing a second changed region information representing a second changed region in which an image is drawn in the frame memory based on the drawing command into the general-purpose memory, and
- wherein the image transmission processing module
  (i) acquires from the frame memory a partial image corresponding to a region of the second changed region which is not included in the first changed region with reference to the first and second changed region information stored in the general-purpose memory,
  (ii) acquires a partial image corresponding to the first changed region not from the frame memory but from the image storage region for transmission, and
  (iii) transmits the acquired partial image together with screen update region information representing a screen update region that is a sum of the first and second changed regions to the image display device through the interface.

17. The computer according to claim 15, further comprising:
- an application program that can issue a drawing command of an image;
- a drawing module for processing the drawing command which is issued by the application program; and
- a hook processing module which hooks a predetermined drawing command issued by the application program for fetching the drawing command in advance and draws an image in a predetermined image storage region for transmission included in a general-purpose memory based on the acquired drawing command,
- wherein the image transmission processing module has a function of acquiring an image from the image storage region for transmission and transmitting the acquired image to the image display device through the interface,
- wherein the hook processing module has functions of writing a first changed region information representing a first changed region which is a region in the image storage region for transmission in which an image is drawn based on the predetermined drawing command into the general-purpose memory and supplying the drawing command to the drawing module after processing the predetermined drawing command,
- wherein the drawing module has functions of drawing an image in the frame memory based on a drawing command received from the application program or the hook processing module and writing a second changed region information representing a second changed region in which an image is drawn in the frame memory based on the drawing command into the general-purpose memory, and
- wherein the image transmission processing module
  (i) acquires from the frame memory a partial image corresponding to a region of the second changed region which is not included in the first changed region with reference to the first and second changed region information stored in the general-purpose memory,
  (ii) acquires a partial image corresponding to a region of the second changed region which is included in the first changed region not from the frame memory but from the image storage region for transmission, and
  (iii) transmits the acquired partial image together with screen update region information representing a screen update region which is the same as the second changed region to the image display device through the interface.

18. A method of controlling an image display device which is connected to a general-purpose interface connectable to a plurality of types of general-purpose devices as an interface for a computer and displays an image based on image data supplied from computer, wherein the image display device includes an image display unit that displays an image based on the image data, the method comprising:
- (a) transmitting identification information, which indicates that the image display device is a mass storage device, to the computer using the image display device for starting the data communication; and
- (b) receiving the image data from the computer using the image display device as the mass storage device and supplying the received image data to the image display unit for display.

* * * * *